(12) United States Patent  
Kodaira

(10) Patent No.: US 8,830,545 B2  
(45) Date of Patent: Sep. 9, 2014

(54) DOCUMENT IMAGE PROCESSING SYSTEM INCLUDING PIXEL COLOR SUBSTITUTION

(75) Inventor: Naoaki Kodaira, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 738 days.

(21) Appl. No.: 13/026,735

(22) Filed: Feb. 14, 2011

(65) Prior Publication Data

US 2011/0222134 A1 Sep. 15, 2011

(30) Foreign Application Priority Data

Mar. 15, 2010 (JP) ................. P2010-058475

(51) Int. Cl.
| | | |
|---|---|---|
| *G03F 3/08* | (2006.01) | |
| *H04N 1/64* | (2006.01) | |
| *G06K 9/00* | (2006.01) | |
| *G06K 9/46* | (2006.01) | |
| *G06K 9/38* | (2006.01) | |

(52) U.S. Cl.
CPC .............. *G06K 9/4652* (2013.01); *H04N 1/642* (2013.01); *G06K 9/00449* (2013.01); *G06K 9/38* (2013.01)
USPC .......... 358/518; 358/1.1; 358/1.15; 358/1.16; 358/1.9; 358/2.1; 358/426.01; 358/426.02; 358/426.08; 382/162; 382/164; 382/165; 382/166; 382/167; 382/168; 382/171; 382/172; 382/173; 382/174

(58) Field of Classification Search
None
See application file for complete search history.

(56) References Cited

U.S. PATENT DOCUMENTS

| | | | |
|---|---|---|---|
| 6,148,102 A * | 11/2000 | Stolin | 382/164 |
| 2009/0074271 A1 | 3/2009 | Nakamura et al. | |
| 2010/0238470 A1 | 9/2010 | Kodaira | |
| 2012/0201462 A1* | 8/2012 | Chang et al. | 382/190 |

FOREIGN PATENT DOCUMENTS

| | | |
|---|---|---|
| CN | 101389261 A | 3/2009 |
| JP | 11-96297 | 4/1999 |
| JP | 2010-219848 | 9/2010 |

OTHER PUBLICATIONS

Machine translation of Japanese Patent Publication 2007-335983 to Yanagi, published Dec. 27, 2007.*

* cited by examiner

*Primary Examiner* — Paul F Payer
(74) *Attorney, Agent, or Firm* — Finnegan, Henderson, Farabow, Garrett & Dunner, L.L.P.

(57) ABSTRACT

A document image processing system includes an extraction portion, an estimation portion, a calculation portion, a substitution portion, and a generation portion. The extraction portion extracts first and second document elements of an inputted document image and a preprint data. The estimation portion estimates first and second representative colors due to first and second document elements in a color space, respectively. The calculation portion calculates first and second planes to separate the color space into first and second subspaces which each includes each of the first and second representative colors, respectively. The substitution portion substitutes a color of a first pixel of the first document elements with the first representative color and a color of a second pixel of the second document elements with the second representative color. The generation portion subtracts each of the substituted first pixel from each of the substituted second pixel to generate a difference image.

16 Claims, 21 Drawing Sheets

DOCUMENT IMAGE PROCESSING SYSTEM INCLUDING PIXEL COLOR SUBSTITUTION

CROSS-REFERENCE TO RELATED APPLICATION

This application is based upon and claims the benefit of priority from Japanese Patent Application No.2010-058475, filed on Mar. 15, 2010, the entire contents of which are incorporated herein by reference.

FIELD

Embodiments described herein relate generally to a document image processing system, a document image processing method, and a computer readable storage medium storing instructions of a computer program thereof.

BACKGROUND

When a document such as ledger sheet is read as a digital data by a scanner, the digital data may be saved as a monochrome image and a gray-scale image to decrease amount of data. However, recently, saving as a color image is required with increasing color documents due to spread of color printers.

The color image has larger amount of data compared with the monochrome image and the gray-scale image. Therefore, the color image may be compressed to be saved.

The JPEG (Joint Photographic Experts Group) format is well known as means to compress a color image at a high compression ratio. However, when a document image containing characters is compressed at a high compression ratio using the JPEG format, edge portions of the characters become blurred due to block noises so that visibility becomes poor.

A known technique to eliminate the problem is to subtract colors of an original image when the original image is compressed. When a document is scanned by the scanner, number of the colors may become huge due to quantization error and position shift. Therefore, color subtraction technique to decrease number of the colors is effective in order to decrease amount of data for compressing the color image. In the color subtraction technique, the number of colors to be used is determined by performing either a Hough transform or a main-component analysis on a frequency distribution in a color space. In addition, liner distributions of colors in the color space are acquired. The acquired distributions are classified into several clusters. Then, the several colors of the respective classified clusters are used to perform color subtraction.

Furthermore, there is a technique to extract only elements which are written by hand, from a ledger sheet in which form to fill is previously printed. When the ledger sheet is scanned by a scanner and scanned image data of the ledger sheet is transmitted using a communication mean, it is take a lot of cost to transmit whole scanned image data because the whole scanned image data has huge amount. In the case of the ledger sheet, a person may fill the form by hand-writing, the form being previously printed.

Since an image data (hereinafter, referred to as "preprint data") printed previously is known, the elements written by hand is important. Therefore, high efficiency can be achieved by extracting only elements written by hand from a scanned image and transmitting the elements. A receiver can reconstruct an image data which is same as the scanned image data at a transmitter by synthesizing the received elements and the preprint data which is previously hold.

Images of edge portions of the characters, however, are more likely to have colors different from the color of the actually used ink, due to color shift that occurs at the time of scanning and the like. For example, the edge portions may have an intermediate color due to an influence of both the ink color and the background color. This case does not show a definite processing for the color deviating from the linear distribution, cannot handle the intermediate color appropriately.

A document image of ledger sheets or the like, sometimes, has a particular field intentionally dotted to be colored with an intermediate color. In addition, in some cases, some characters are printed over the halftone dote using an ink of the same color as that of the halftone dots. In this case, the following problem may be caused. If the color substitution processing of the document image is performed, the characters and the halftone dots may be recognized as having the same color so that the characters may be difficult to read. Furthermore, if letters, ruled lines, and other images are printed in a ledger sheet by using similar colors, an image of the ledger sheet has difficulty in classifying. For example, when an image is read from a document, on which characters or ruled lines of a red color are printed previously and on which a seal impression of a vermilion color is below added, it is difficult to classify the red color of the characters or ruled lines and the vermilion color into different color clusters.

BRIEF DESCRIPTION OF THE DRAWINGS

Aspects of this disclosure will become apparent upon reading the following detailed description and upon reference to the accompanying drawings. The description and the associated drawings are provided to illustrate embodiments of the invention and not limited to the scope of the invention.

DETAILED DESCRIPTION

According to one aspect of the invention, a document image processing system includes an extraction portion to extract first document elements of an inputted document image from pixels of the inputted document image and second document elements of a preprint data corresponding to the inputted document image from pixels of the preprint data; an estimation portion to estimate first representative colors in a color space, each of the first representative colors corresponding to each of the first document elements, and second representative colors in the color space, each of the second representative colors corresponding to each of the second document elements; a calculation portion to calculate at least one first plane to separate the color space into first sub-spaces which each includes each of the first representative colors and at least one second plane to separate the color space into second sub-spaces which each includes each of the second representative colors; a substitution portion to substitute a color of a first pixel included in each of the first document elements with the first representative color which is located in one of the first sub-spaces in which the color of the first pixel exists, and a color of a second pixel included in each of the second document elements with the second representative color which is located in one of the second sub-spaces in which the color of the second pixel exists; and a generation portion to subtract each of the substituted first pixel from each of the substituted second pixel to generate a difference image.

The embodiments will be explained with reference to the accompanying drawings.

Description of the First Embodiment

Figure 1:
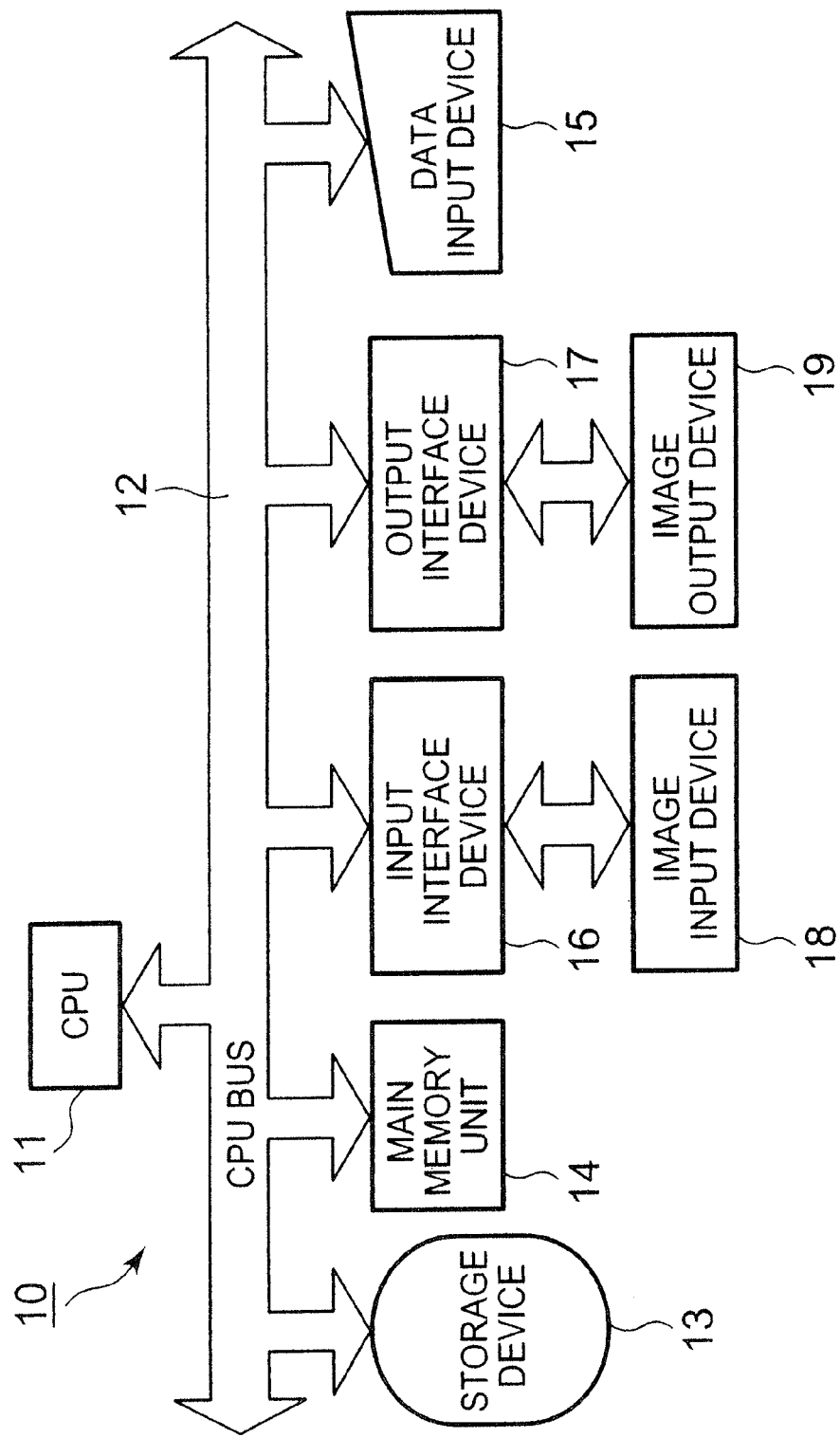
FIG. 1 is a diagram illustrating a configuration of a document image processing system according to a first embodiment.

FIG. 1 is a diagram illustrating a configuration of a document image proceeding system 10 according to a first embodiment of the invention.

The document image processing system 10 is provided with a CPU 11, a CPU bus 12, a memory device 13, a main memory portion 14, a data input device 15, an input interface device 16, an output interface device 17, an image input device 18, an image output device 19.

The CPU 11, the CPU bus 12, the memory device 13, the main memory portion 14, the data input device 15, the input interface device 16 and the output interface device 17 compose a computer.

The CPU 11, the memory device 13, the main memory portion 14, the data input device 15, the input interface device 16 and the output interface device 17 are connected to one another through the CPU bus 12.

The memory device 13 is a working memory for the CPU 11. The memory device 13 is formed of such a device as a magnetic disc drive or a semiconductor memory.

The main memory portion 14 includes a program storage area and a temporary memory area. A document image processing program can be stored in the program storage area.

The document image processing program controls the document image processing system 10. The temporary memory area is used for the CPU 11. The main memory portion 14 is formed of a device such as a semiconductor memory.

The document image processing program is stored in the memory device 13, and is loaded to the main memory portion 14 from the memory device 13 when the document image processing system 10 is booted.

The data input device 15 is formed of an equipment such as a keyboard or a mouse. Data or instructions are inputted in response to operations performed by an operator. The input interface device 16 is connected to the image input device 18. The image input device 18 is a scanner device to read a document on which characters and images of ruled lines, graphics and photos other than the characters are printed. The input interface device 16 inputs a document image data read by the image input device 18. The document image data are sent to the memory device 13 through the CPU bus 12, and are stored in the memory device 13.

The output interface device 17 is connected to the image output device 19. The output interface device 17 receives the document image data stored in the memory device 13 through the CPU bus 12, and outputs the received document image data to the image output device 19. The image output device 19 is a device which outputs the document image data received through the output interface device 17, and is, for example, a display device, a printing device or a filing device.

Figure 2:
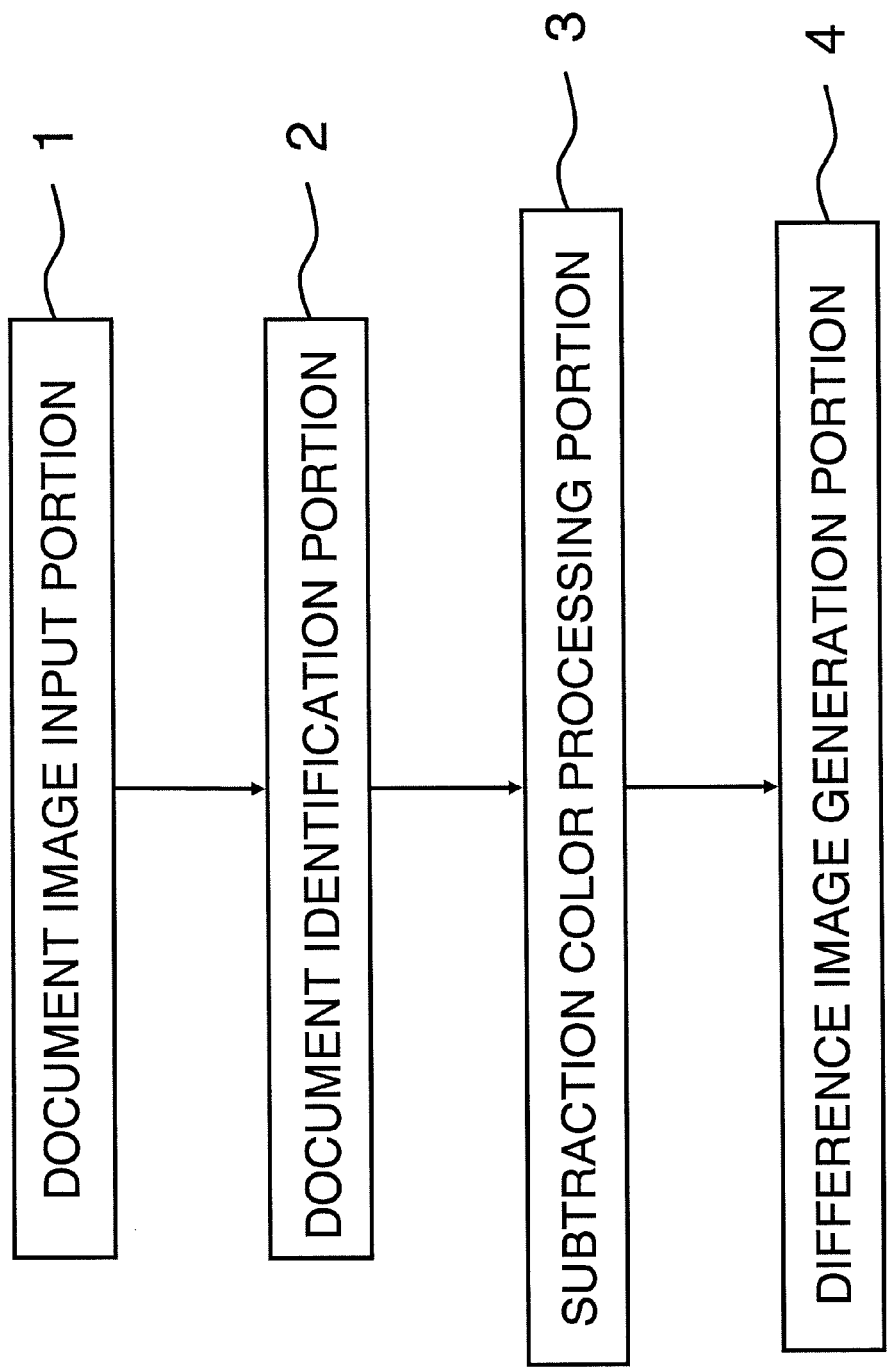
FIG. 2 is a diagram illustrating a functional configuration of a CPU shown in FIG. 1.

FIG. 2 is a diagram illustrating the functional configuration of a CPU shown in FIG. 1 according to the first embodiment. The CPU 11 performs an overall control over the document image processing system 10. The CPU 11 includes a document image input portion 1, a document identification portion 2, a subtraction color processing portion 3, and a difference image generation portion 4. The document image input portion 1, the document identification portion 2, the subtraction color processing portion 3, and the difference image generation portion 4 represent operation functions respectively being performed when the CPU 11 executes the document image processing program.

In the first embodiment, a preprint data is supplied to the document image processing system 10 from the image input device 18. Then, the document image processing system 10 stores the preprint data in the memory device 13 as a preprint data previously stored. (Hereinafter, the preprint data previously stored is referred to as just "stored preprint data".) The operation of the document image processing system 10 like above will be explained with reference to FIGS. 3 to 19. In the following explanation, the stored preprint data is already stored in the memory device 13 with identification information (described later) which is obtained by the document identification portion 2.

The document image input portion 1 shown in FIG. 2 functions as an input portion which receives document image data. The document image data are color image data being read by a scanner device.

Figure 3:
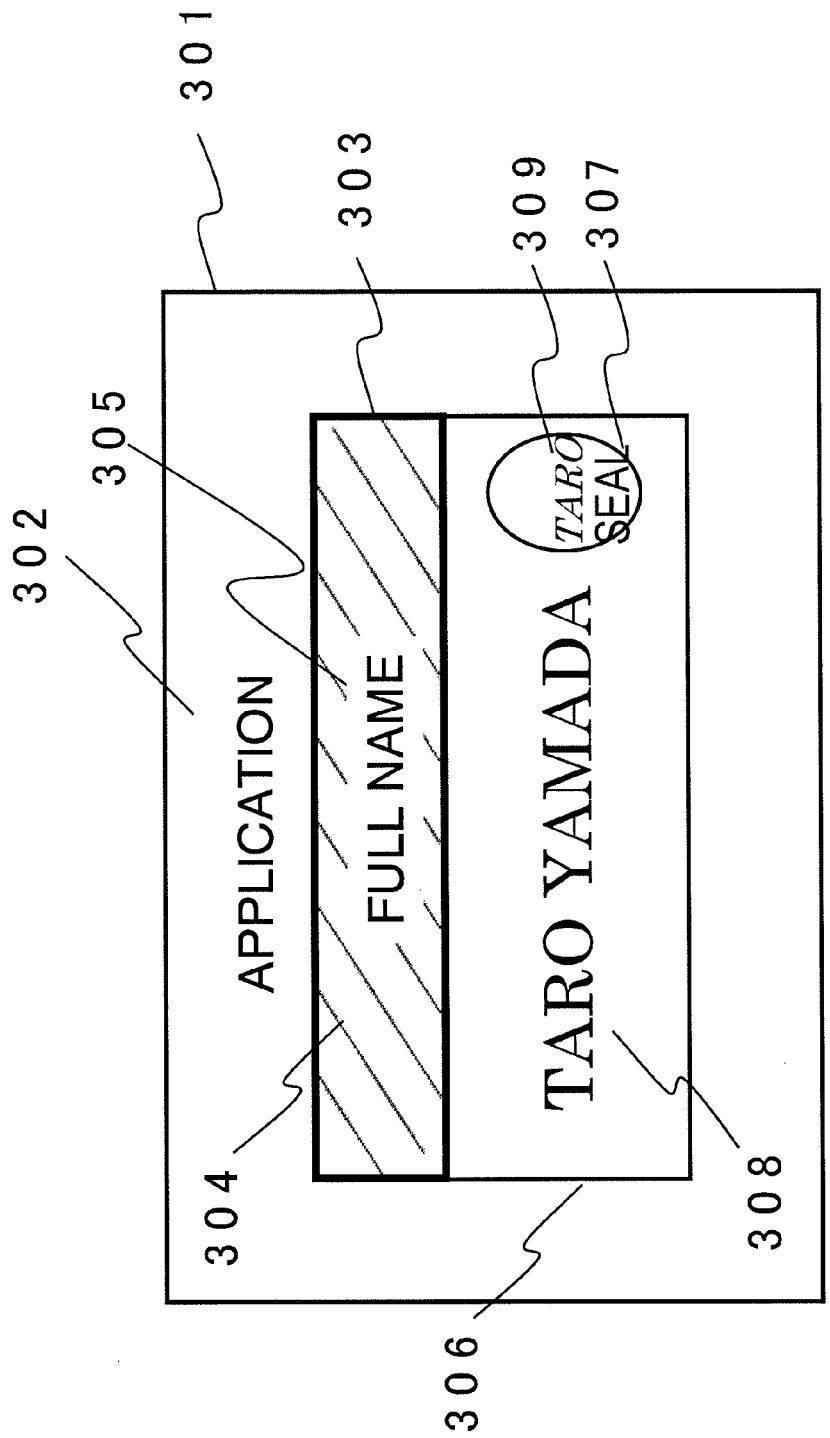
FIG. 3 is a diagram illustrating an example of a document image to be inputted into a document image input portion shown in FIG. 2.

FIG. 3 is a diagram illustrating an example of a document image 301, which is image data of a color document to be inputted into a document image input portion 1 shown in FIG. 2 (hereinafter, referred to as "inputted document image"). For example, the document image 301 includes a background having a white color, a character "Application" 302 having a red color, a thick-line frame 303 having a blue color, a halftone-dotted portion 304 having a light blue color, characters "Full Name" 305 having a blue color, a ruled-line frame 306 having a black color, characters "seal" 307 having a black color, written-in characters "Yamada Taro" 308 having a light black color, and a seal 309 having a vermilion color. These may be displayed on a sheet by printing or handwriting. The written-in characters "Yamada Taro" 308 may be written by hand-writing using a pencil. The seal 309 has a smaller number of pixels than each of the other, different-colored portions.

Figure 4:
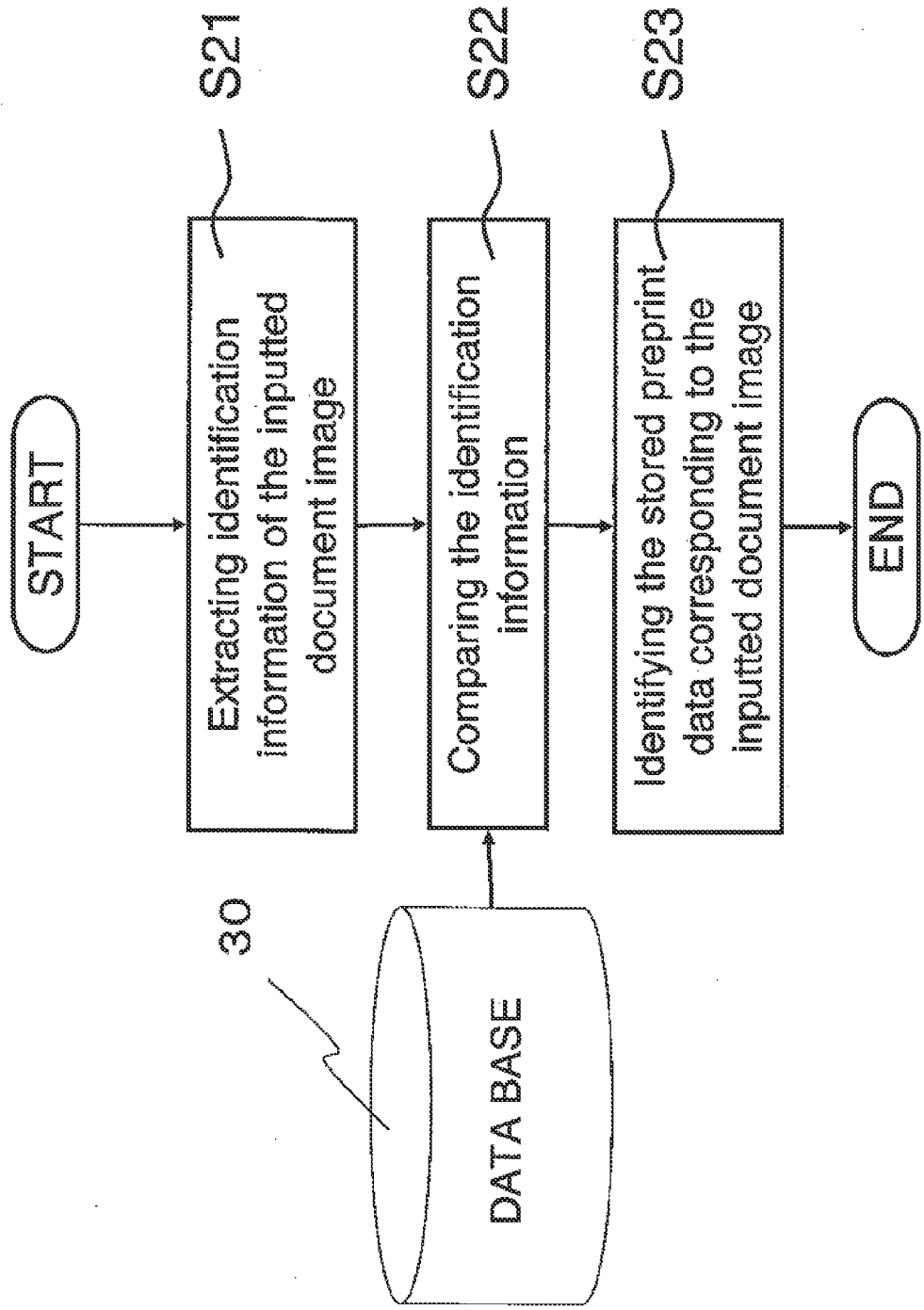
FIG. 4 is a flowchart illustrating an example of processing being performed by a document identification portion shown in FIG. 2.

The document identification portion 2 shown in FIG. 2 compares the inputted document image which is received by the document image input portion 1 with the stored preprint data which is stored in the memory device 13, to obtain a comparison result. Based on the comparison result, the document identification portion 2 identifies the stored preprint data which corresponds to the inputted document image. FIG. 4 is a flowchart illustrating an example of processing being performed by the document identification portion 2.

In FIG. 4, the document identification portion 2 extracts identification information of the inputted document image (step S21 in FIG. 4). The identification information may include document size, attribute information as document elements such as ruled-lines and characters which are preprinted, position of the document element, and shape of the document element. For example, in the inputted document image 301 shown in FIG. 3, size of the inputted document image 301, preprinted characters "Application" 302, "Full Name" 305, a preprinted thick-line frame 303, and a preprinted ruled-line frame 306 are the identification information. The identification information is extracted by performing binarization processing, linkage component extraction processing, feature amount measurement processing, and attribute classification processing. In the binarization processing, a binarization plane described later can be obtained. These processing are described in detail later.

Next, the document identification portion 2 compares the identification information of the stored preprint data which is stored in a DB (Data Base) 30 with the identification information of the inputted document image 301 (step S22 in FIG. 4). As a result, a stored preprint data having a corresponding or closest identification information to the identification information of the inputted document image 301 is the stored preprint data corresponding to the inputted document image 301 (step S23 in FIG. 4). A method disclosed in JP-2002-109469-A can be applied to identify the stored preprint data corresponding to the inputted document image 301. In the first embodiment, the identification information of the stored preprint data is previously stored in the DB 30, however, the identification information of the stored preprint data may be extracted when the identification information of the inputted document image 301 is extracted, together.

Figure 5:
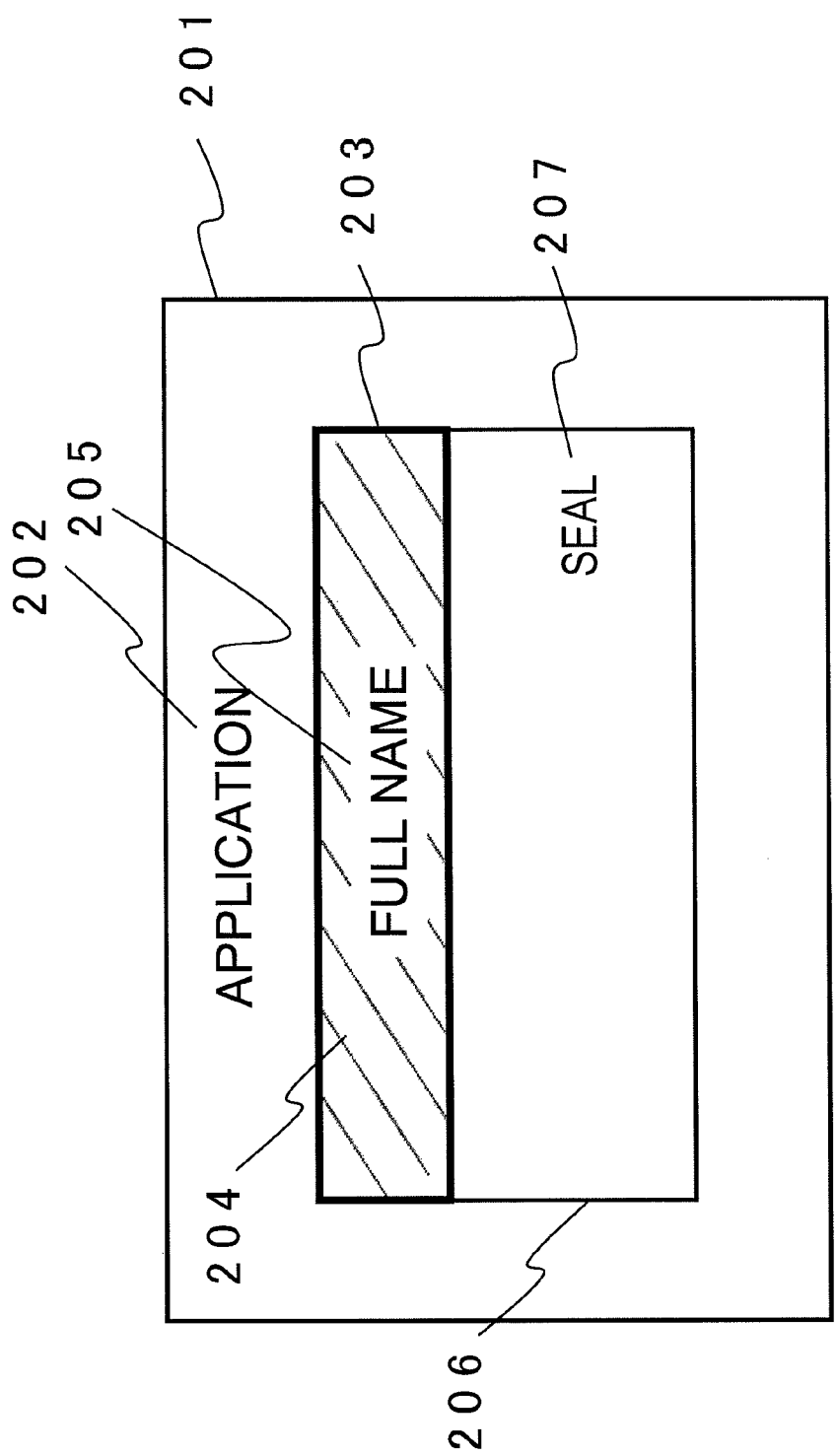
FIG. 5 is a diagram illustrating an example of a preprint data identified by the document identification portion shown in FIG. 2 from a memory device and corresponding to the inputted document image shown in FIG. 3.

FIG. 5 is a diagram illustrating a stored preprint data 201 corresponding to the inputted document image 301, which is identified by the document identification portion 2. For example, the stored preprint data 201 includes a background having a white color, characters "Application" 202 having a red color, a thick-line frame 203 having a blue color, a halftone-dotted portion 204 having a light blue color, characters "Full Name" 205 having a blue color, a ruled-line frame 206 having a black color, and characters "seal" 207 having a black color.

The subtraction color processing portion 3 shown in FIG. 2 subtracts colors for each of the inputted document image 301 and the stored preprint data 201. Specifically, the subtraction color processing portion 3 extracts document elements such as characters and ruled-lines from a document image. Next, a representative color of each of the document elements and a separation plane between the representative colors are obtained. Next, a sub-space surrounded by the binarization plane and the separation planes is substituted the representative color. As a result, the colors are subtracted for a document image.

Figure 6:
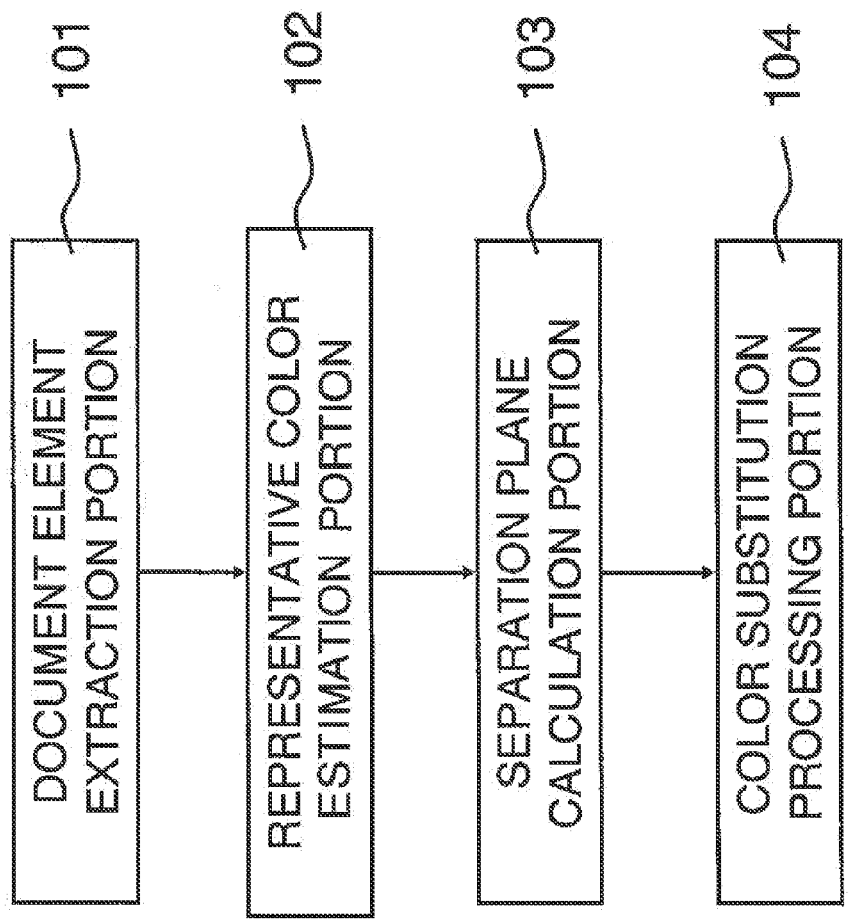
FIG. 6 is a diagram illustrating a functional configuration of a subtraction color processing portion shown in FIG. 2.

FIG. 6 is a diagram illustrating a functional configuration of a subtraction color processing portion 3. The subtraction color processing portion 3 includes a document element extraction portion 101, a representative color estimation portion 102, a separation plane calculation portion 103, and a color substitution processing portion 104. Operation of the subtraction color processing portion 3 applying for the inputted document image 301 is explained with reference to FIGS. 6 to 15.

Figure 7:
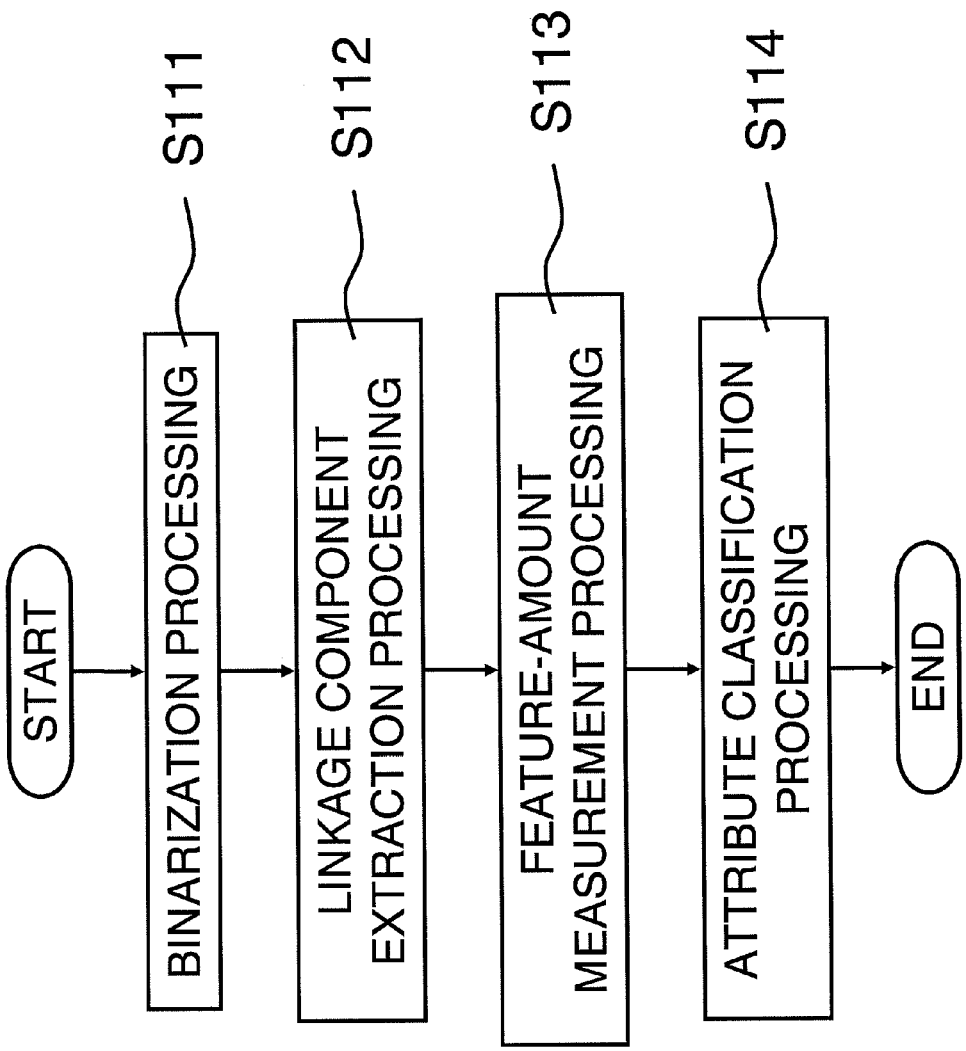
FIG. 7 is a flowchart illustrating an example of processing being performed by a document element extraction portion shown in FIG. 6.

The document element extraction portion 101 extracts document elements, such as characters and ruled lines, from the document image. FIG. 7 is a flowchart illustrating an example of processing being performed by the document element extraction portion 101. The document element extraction portion 101 performs binarization processing, linkage component extraction processing, feature amount measurement processing, and attribute classification processing. Hereinafter, these types of processing will be described in detail with reference to FIGS. 8 to 10.

Binarization Processing:

The document element extraction portion 101 performs binarization processing as pre-processing (step S111 in FIG. 7). In this identification of document elements, such dark colors as to make the elements distinguishable from the background are important in general. Accordingly, noises and halftone-dotted areas are removed to create a binary image including white pixels and black pixels through the binarization processing performed by the document element extraction portion 101. In order to perform the binary image creation, commonly known techniques are available. For example, a discriminant analysis method, in which an optimum threshold is obtained when a grayscale image is subjected to binarization processing, may be used.

Figure 8:
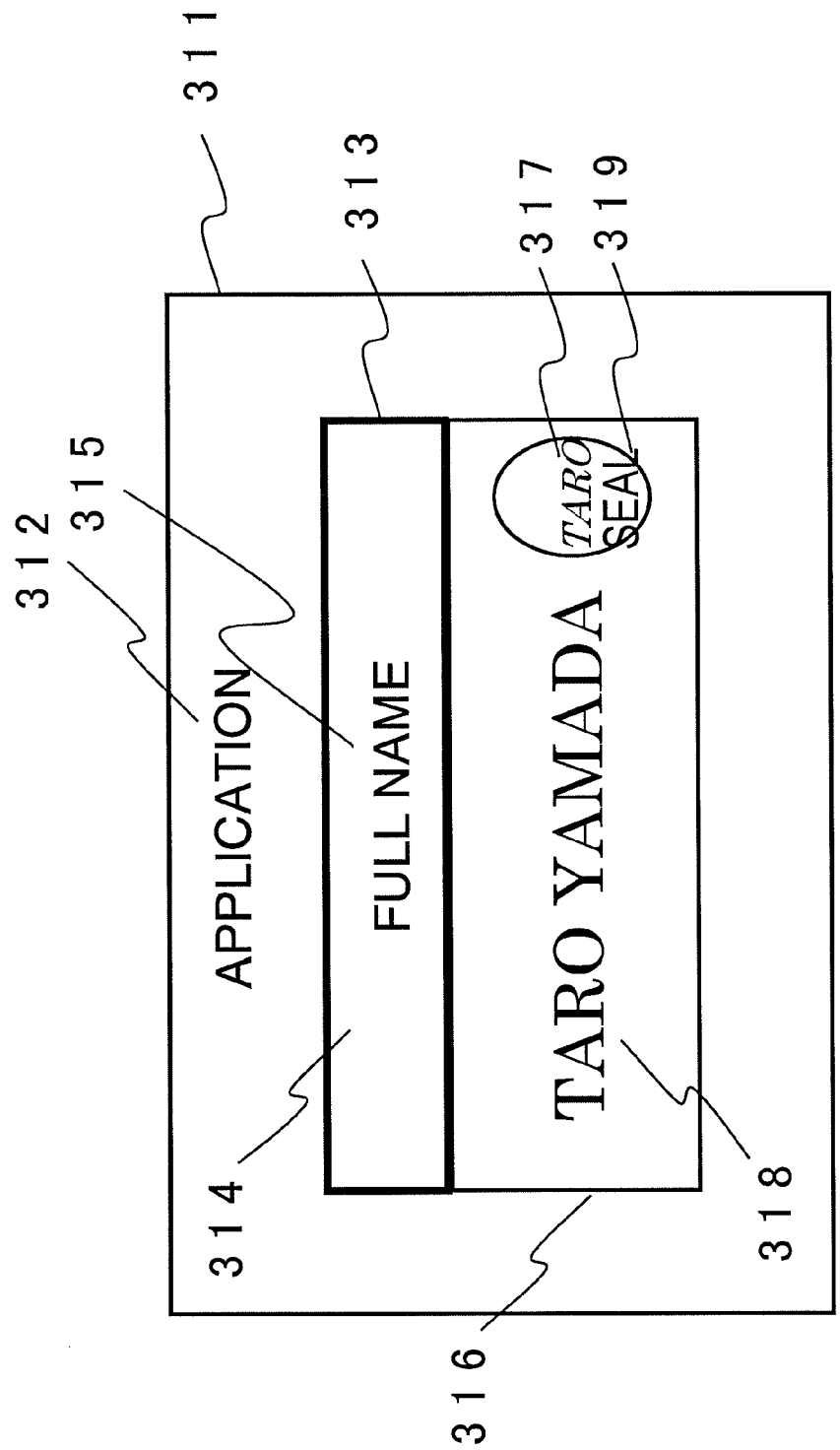
FIG. 8 is a diagram illustrating an example of a binary image being created by performing a binarization processing on the inputted document image shown in FIG. 3.

FIG. 8 is a diagram illustrating an example of a binary inputted document image 311 created by performing binarization processing on the document image 301 shown in FIG. 3. The binary inputted document image 311 shown in FIG. 8 includes a black-pixel group 312 corresponding to the character group "Application" 302 shown in FIG. 3. Further, the binary inputted document image 311 includes a black-pixel group 313 corresponding to the thick-line frame 303, a black-pixel group 315 corresponding to the character group "Full Name" 305, a black-pixel group 316 corresponding to the ruled-line frame 306, a black-pixel group 317 corresponding to the characters "seal" 307, a black-pixel group 318 corresponding to the written-in characters "Taro Yamada"

308, and a black-pixel group 319 corresponding to the seal 309. However, the halftone-dotted portion 304 shown in FIG. 3 has a light color so that the corresponding portion in FIG. 5 becomes a blank 314.

Linkage Component Extraction Processing:

The document element extraction portion 101 performs linkage component extraction processing (step S112 in FIG. 7) on the binary inputted document image 311 created through the binarization processing. In the linkage component extraction processing, the connectivity of black pixels 312 to 319 is detected and those black pixels that are connected to each other are extracted as a block.

Feature-Amount Measurement Processing:

The document element extraction portion 101 measures feature amounts, such as "size," "shape," "black-pixel proportion," and "black-pixel distribution" with respect to each of the extracted linkage components (step S113 in FIG. 7). For example, in order to measure the "size," a circumscribed rectangle to the linkage component is assumed, and the numbers of pixels arranged in the length side and in the width side of the rectangle are measured. In order to measure the "shape," it is identified whether the shape of the circumscribed rectangle is close to a square or has an elongated shape in the width direction or in the longitudinal direction, for example. In order to measure the "black-pixel proportion," the proportion of the black pixels to the area of the circumscribed rectangle to the linkage component is measured. In order to measure the "black-pixel distribution," it is measured whether the black pixels are uniformly distributed or not uniformly distributed within the circumscribed rectangle to the linkage component.

Attribute Classification Processing:

Using the measurement results of the feature amount measurement processing, the document element extraction portion 101 performs an attribute classification to determine what kind of document element each linkage component is (step S114 in FIG. 7). For example, if a document element has a "size" that is smaller than the size of the document image, has a "shape" that is close to a square and has a high "black-pixel proportion," the document element is identified as a character. If a document element has a "size" that is larger than a character, has a blank internal space, has a low "black-pixel proportion" and a "black-pixel distribution" characterized by the existence of black pixels only in the vicinity of the circumscribed-rectangle perimeters to the linkage component, the document element is identified as a ruled-line frame. If a linkage component is extracted as a character, the linkage component may be identified as a character only on condition that there is another similar linkage component in the peripheral area. Such a way of identification of characters can remove noise components generated at the time of binarization.

Figure 9:
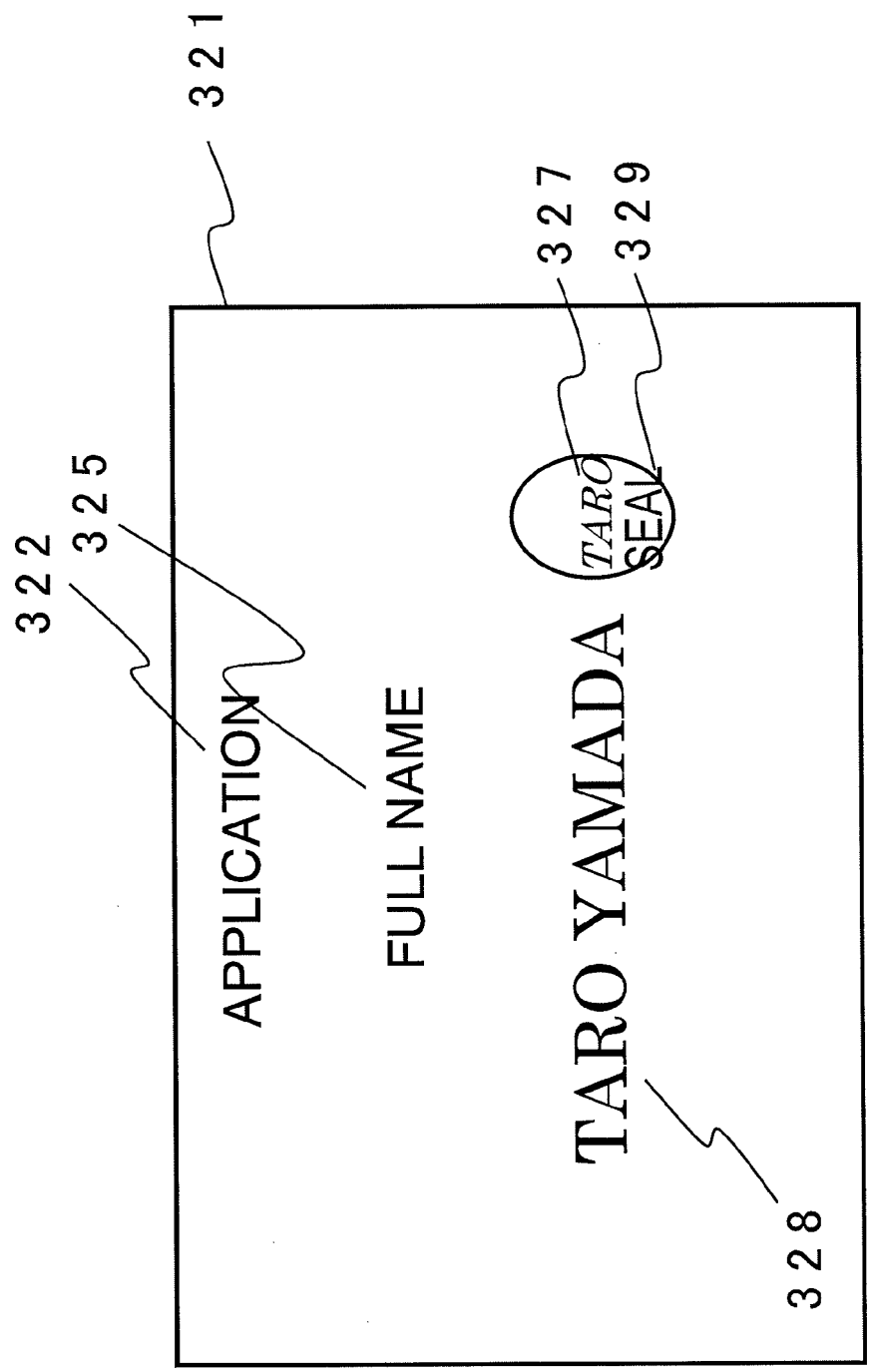
FIG. 9 is a diagram illustrating an example of result of extracting black pixels that are identified as character regions from the binary image shown in FIG. 8.

FIG. 9 is a diagram illustrating an example result of extracting only black pixels 312, 315, 318, which are identified as character regions of the character image 321, from the binary inputted document image 311 shown in FIG. 8. The document element extraction portion 101 extracts "Application" 322, "Full Name" 325, "seal" 327, written-in characters "Taro Yaroada" 328, and a seal 329, as characters of the character image. The character image 321 is only an illustration showing the overall size of the document image, for understanding. Thus, the character image 321 is not the results of extraction performed by the document element extraction portion 101.

Figure 10:
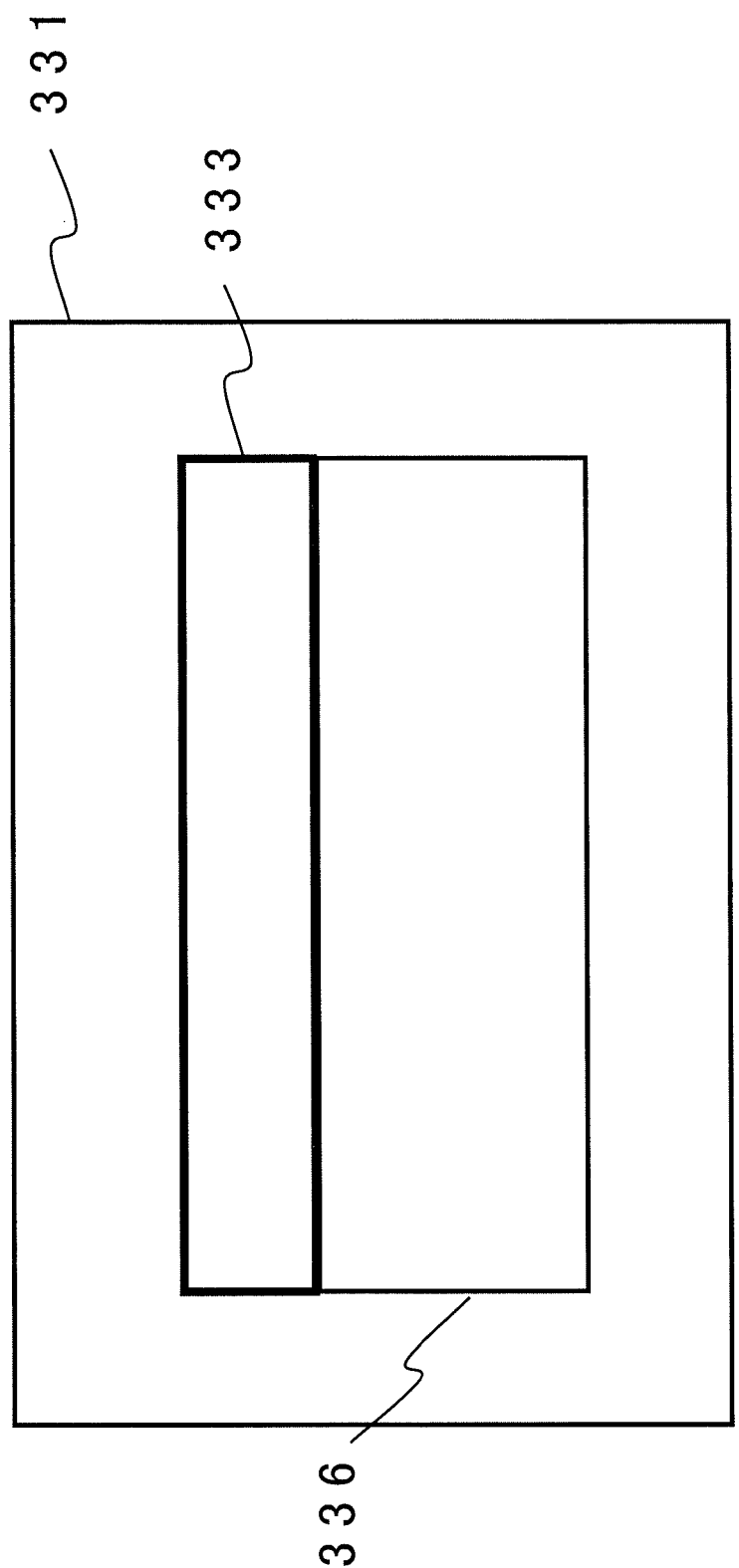
FIG. 10 is a diagram illustrating an example of result of extracting, black images that are identified as ruled-line regions from the binary image shown in FIG. 8.

FIG. 10 is a diagram illustrating an example result of extracting only black images 313, 316, which are identified as ruled-line regions of the ruled-line image 331, from the binary inputted document image 311 shown in FIG. 8. The document element extraction portion 101 extracts a thick-line frame 333 and a ruled-line frame 336 as the ruled-line image 331. As in the case of the character image 321, the ruled-line image 331 is only an illustration showing the overall size of the document image, for convenience. Thus, the ruled-line image 331 is not the results of extraction performed by the document element extraction portion 101. The document element extraction portion 101 functions as an extraction portion to extract document elements of the document image from the pixels of the inputted document image.

Figure 11:
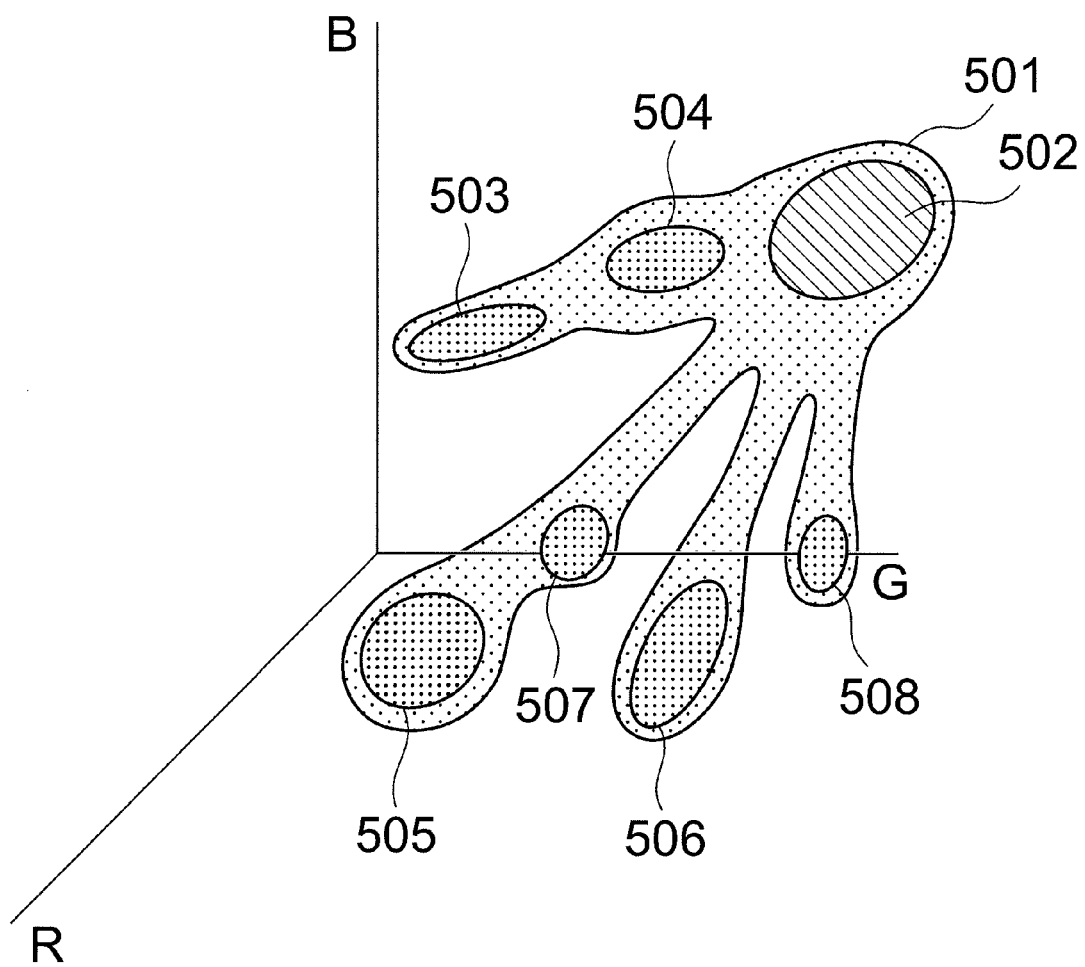
FIG. 11 is a diagram illustrating an example of frequency distributions to explain a concept of processing performed by a representative color estimation portion shown in FIG. 6.

The document element extraction portion 101 outputs the extracted document elements to the representative color estimation portion 102. The representative color estimation portion 102 estimates the colors of the pixels of the extracted document elements, such as the characters and the ruled lines, and the colors of the pixels of background. To this end, the representative color estimation portion 102 uses the frequency distributions in the color space. Specifically, the representative color estimation portion 102 obtains three-dimensional frequency distributions using the document image 301 as the document image data to be inputted. To this end, the color values of the pixels are expressed by the RGB color model. FIG. 11 is a diagram illustrating an example of a frequency distribution 501 to explain a concept of the processing performed by the representative color estimation portion 102. The frequency distributions for all the pixels in the document image 301 to be inputted are acquired and plotted to obtain the frequency distribution 501 shown in FIG. 11.

The frequency distribution 501 includes a frequency distribution for a white-colored background (hereafter referred to as "frequency distribution for a background color") 502, a frequency distribution for blue-colored characters and for ruled lines 503, a frequency distribution for light-blue-colored halftone dots 504, a frequency distribution for black-colored characters and ruled lines 505, a frequency distribution for red-colored characters 506, a frequency distribution for light-black-colored written-in characters 507 which is written by a pencil, and a frequency distribution for a vermilion-colored seal 508.

The frequency distributions 503 to 508 shown in FIG. 11 correspond to the portions of the document image 302 to 309 shown in FIG. 3, as follows. The frequency distribution for a background color 502 corresponds to the background color. The frequency distribution for blue-colored characters and ruled lines 503 corresponds to the thick-line frame 303 and the characters "Full Name" 305. The frequency distribution for light-blue-colored halftone dots 504 corresponds to the halftone-dotted portion 304. The frequency distribution for black-colored characters and ruled lines 505 corresponds to the ruled-line frame 306 and the characters "seal" 307. The frequency distribution for the red-colored characters 506 corresponds to the characters "Application" 302. The frequency distribution for light-black-colored written-in characters 507 corresponds to the written-in characters "Yamada Taro" 308. The frequency distribution for the vermilion-colored seal 508 corresponds to the seal 309.

Frequency distributions for various intermediate colors expand in the areas located between the frequency distribution 502 for a background color and the frequency distributions 503 to 508. The frequency distribution 501 can be considered as one including these intermediate colors. In practice, there are pixels having RGB values outside the frequency distribution 501. Detailed description of these pixels will be given below. In each of the frequency distributions 503 to 508, the RGB value located approximately at the center has the highest frequency. Accordingly, each of the vectors can be considered as the representative color of the corresponding frequency distribution by defining vectors from the frequency distribution for a background color 502 to the frequency distributions 503 to 508 respectively.

Each of the frequency distributions 503 to 508 can be obtained from the region extracted as the corresponding document element alone. In this case, such a vastly-expanded region as the frequency distribution 501 is not produced. The representative color estimation portion 102 functions as an estimation portion to estimate the representative colors for the corresponding extracted document elements in the color space.

Figure 12:
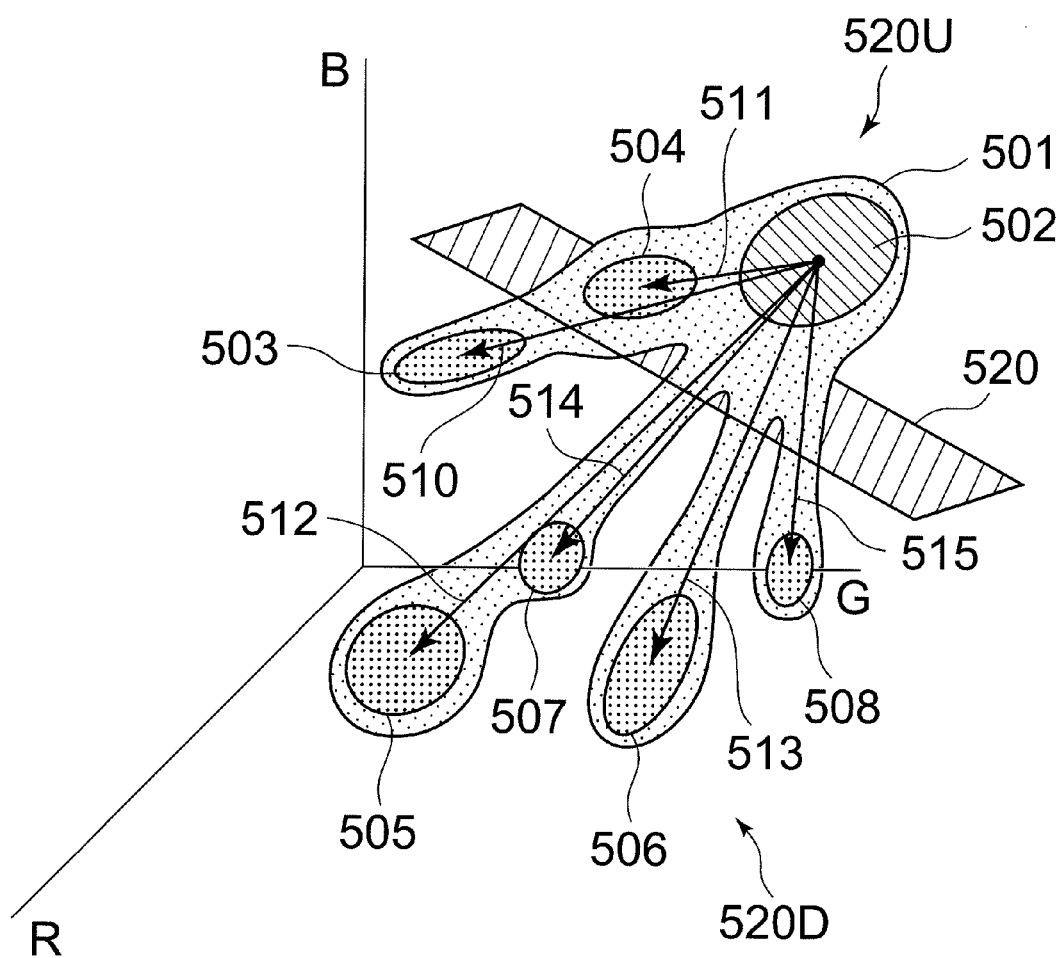
FIG. 12 is a diagram illustrating an example of frequency distributions together with a binarization plane and vectors drawn from a frequency distribution of a background color to the other frequency distributions.

FIG. 12 is a diagram illustrating example frequency distributions together with a binarization plane 520 and vectors 510 to 515 drawn from the frequency distribution for a background color 502 to the corresponding one of the frequency distributions 503 to 508. The frequency distributions 501 to 508 shown in FIG. 12 are the same as those described in FIG. 11. The vectors 510 to 515 are the representative vectors of the frequency distributions 503 to 508 respectively. Furthermore, the frequency distributions 501 are divided by the binarization plane 520 into an upper plane 520U and a lower plane 520D. The end points of the representative vectors 510 to 515 are the RGB values which have the highest frequencies in the frequency distributions 501 to 508. The binarization plane 520 may be obtained by the binarization processing being performed by the document element extraction portion 101 in a step S111 of FIG. 7.

In the case of this embodiment, it is assumed that the representative vectors 510 to 515 are calculated from the frequency distribution 501 of the document image. In this case, the representative vector of each frequency distribution can be calculated by obtaining the local maximum values for the frequency distributions 503 and 505 to 508. However, there may be problems associated with intermediate colors. When intermediate colors exist as in the frequency distribution 504, the frequency distribution 501 extends in a horizontal direction. In addition, the distance between the frequency distribution 504 and the frequency distribution 503 is short. Accordingly, the frequency distribution 504 may be influenced by the frequency distribution 503. As a result, the calculation of the representative vector 511 of the frequency distribution 504 may be incorrect. Conversely, the calculation of the representative vector 510 of the frequency distribution 503 may be incorrect due to the influence of the frequency distribution 504.

The frequency distribution for a vermilion color 508 has the smaller number of pixels than each of the other frequency distributions 502 to 507. Thus, the representative vector 515 cannot be calculated correctly in some cases of particular extension from the frequency distribution for a background color 502. If the calculated representative vector 515 is incorrect, the separation plane calculation portion 103 cannot calculate a correct separation plane in a less visible image. Detailed description for the separation plane calculation portion 103 will be given below.

In order eliminate this problem, the representative vectors for important document elements, such as characters and ruled lines, are calculated not from the entire frequency distribution in this embodiment. Instead, the representative vectors are determined by separating the colors of such important document elements from the background color and from the intermediate colors. To this end, the embodiment uses the results of the binarization processing and of the document element extraction performance, both of which are performed by the document element extraction portion 101.

FIG. 12 is a diagram illustrating an example case where the frequency distributions 501 are divided by the binarization plane 520 into an upper plane 520U and a lower plane 520D. Dividing the frequency distribution 520 into the upper plane 520U and the lower plane 520D means binarization processing performed in the color space in the RGB model. The upper plane 520U is a light-colored region for the background, whereas the lower plane 520D is a dark-colored region for document elements such as characters and ruled lines. Among the frequency distributions existing in the upper plane 520U, the frequency distribution for a background color 502 has a local maximum (RGB value) which is significantly larger than the local maximum of the frequency distribution for light-blue-colored halftone dots 504. The much larger local maximum allows the frequency distribution for a background color 502 to be estimated as the representative color of the background color, which serves as the reference for the representative vectors. Subsequently, the local maximum of the frequency distribution for light-blue-colored halftone dots 504, which is supposed to have the next local maximum, is obtained, and the obtained local maximum is determined as the representative color for the frequency distribution 504.

Subsequently, the local maximums of the frequency distributions 503 and 505 to 508 existing in the lower plane 520D are obtained to determine the representative colors for the frequency distributions 503 and 505 to 508. The representative colors are not determined on the basis of the overall frequency distribution. Instead, each representative color is determined on the basis of the frequency distribution using the results of extracting document elements. Specifically, the representative colors are obtained individually on the basis of the frequency distribution for blue-colored characters and ruled lines 503, the frequency distribution for light-blue-colored halftone dots 504, the frequency distribution for black-colored characters and rules lines 505, the frequency distribution for red-colored characters 506, the frequency distribution for light-black-colored characters 507, and the frequency distribution for a vermilion-colored seal 508. The representative colors thus obtained are not affected by the extension of the distribution. Thus, the representative colors can be determined correctly. The technique disclosed in JP-H5-61974-A may be used as a specific method of calculating representative vectors. According to the technique, when the RGB data on the document image are inputted, local maximums are detected by creating a density histogram. Then, the calculation of representative vectors are achieved by converting the local maximums detected into directional-vector data on the local maximums from the reference point set at the background color.

Figure 13:
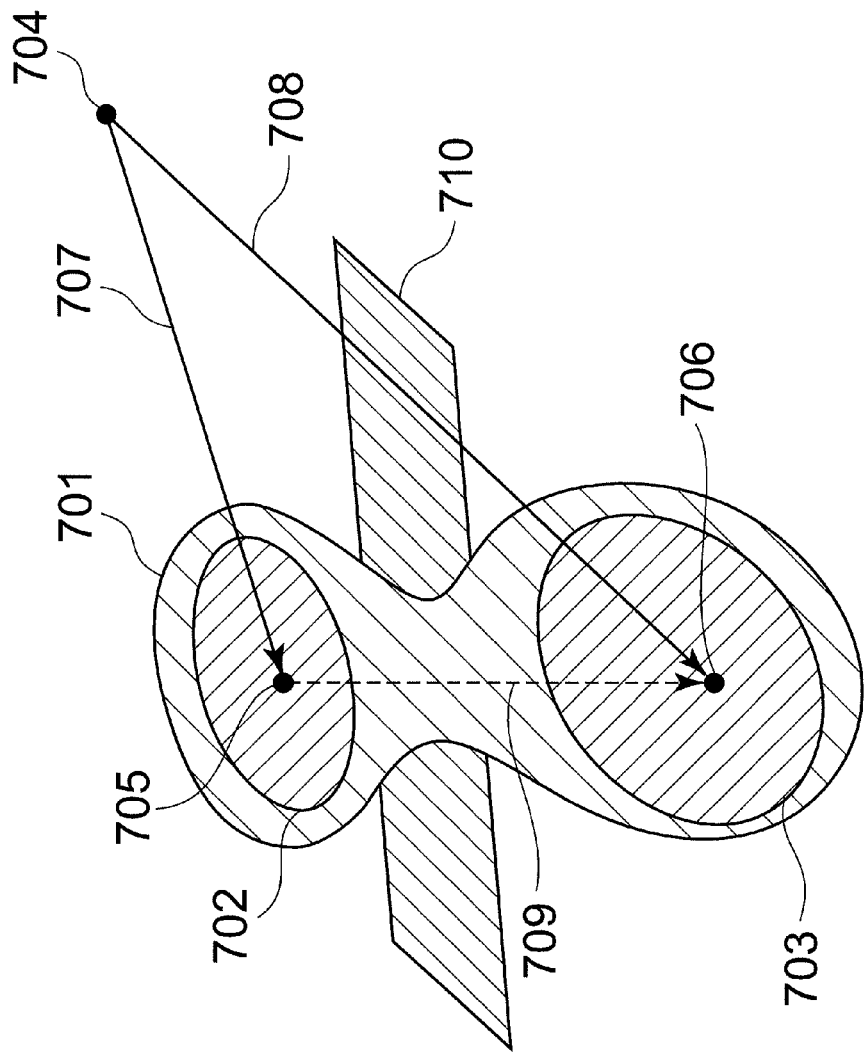
FIG. 13 is a diagram illustrating an example of frequency distribution to explain a processing being performed by a separation plane calculation portion.

The separation plane calculation portion 103 calculates a plane to separate representative colors in the color space. FIG. 13 is a diagram illustrating example frequency distributions to explain the processing performed by the separation plane calculation portion 103. In the color space shown in FIG. 13, a frequency distribution 701 exists, and the frequency distribution 701 includes distributions for two colors, which are a frequency distribution 702 and a frequency distribution 703. For example, the frequency distribution 702 corresponds to the frequency distribution 504 in FIG. 11, whereas the frequency distribution 703 corresponds to the frequency distribution 508 in FIG. 11.

The colors of the frequency distributions 701 to 703 are the colors of the document elements, such as the characters, the ruled lines and the light-blue-colored halftone dots. The representative colors of the frequency distributions 702 and 703 will be referred to as a representative color 705 and a representative color 706, respectively. In addition, the representative color of the background color will be referred to as a representative color 704. The frequency distribution 502 shown in FIG. 11 may be an example frequency distribution for the background color. In this example, the frequency distributions 702 and 703 are of different colors, but are not separated from each other completely as shown in the frequency distribution 701.

It is often the case that such distributions exist actually. This phenomenon may occur if characters of one color and ruled lines of a different color exist or if characters and rules lines exist so as to be in contact with each other. In this state, when the color substitution processing portion 104, which will be described in detail below, cannot determine which one of the representative colors should be used when it substitutes the colors of the pixels with a representative color. Accordingly, a separation plane 710 between the frequency distributions of the two colors is calculated. All the pixels having RGB values located above the separation plane 710 can be substituted with the representative color 705. Similarly, all the pixels having RGB values located below the separation plane 710 can be substituted with the representative color 706. The separation plane calculation portion 103 functions as a calculation portion to calculate the separation plane 710 which separates the estimated representative colors in the color space.

A specific way of calculating the separation plane 710 will be described. Representative vectors 707 and 708 of two colors are obtained from the representative color 704 of the background color and the representative colors 705 and 706 of the respective frequency distributions 702 and 703. Then, a vector 709 between the two colors is obtained. The directional vector for the vector 709 is assumed to be expressed as (a, b, c). If the separation plane 710 is perpendicular to the vector 709, the normal vector to the separation plane 710 is expressed also as (a, b, c). Accordingly, the separation plane 710 is expressed by the following equation (1).

$$ax+by+cz+d=0 \tag{1}$$

Figure 14:
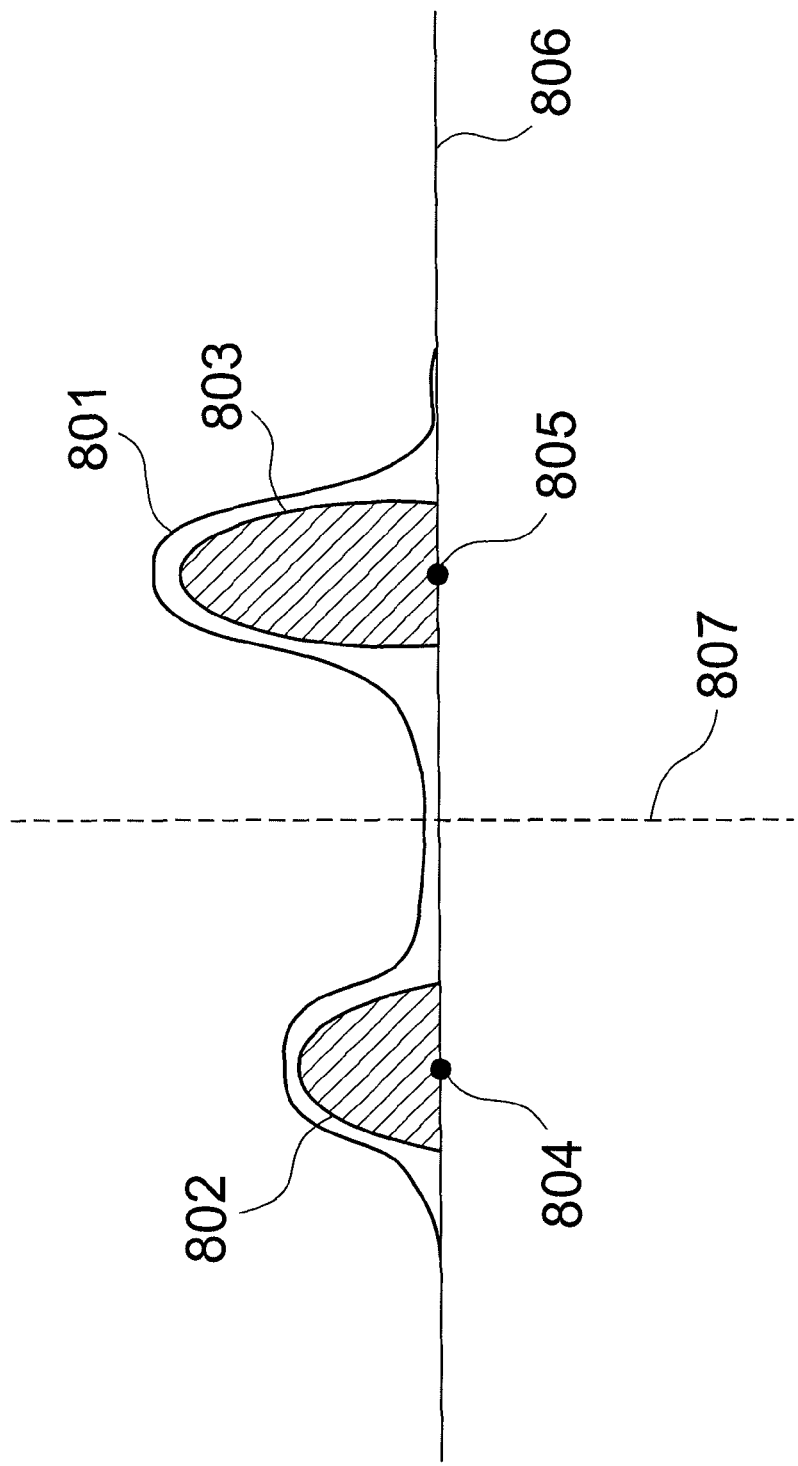
FIG. 14 is a diagram illustrating an example of frequency distribution in which the frequency distribution shown in FIG. 13 is projected to a vector between representative colors.

How to obtain the coefficient d will be described. FIG. 14 is a diagram illustrating an example of frequency distributions, in which the distributions between the two colors shown in FIG. 13 are projected to a vector between the representative colors. The vector 709 in FIG. 13 corresponds to a projection axis 806. The representative colors 705 and 706 in FIG. 13 correspond respectively to distributions 804 and 805 after the projection. The frequency distributions 701 to 703 in FIG. 13 correspond respectively to the projection distributions 801 to 803. The projection distributions 801 to 803 are used to calculate a separation plane 807. As in the case of the binarization processing, a well-known discrimination analysis method may be used as the calculation method. As a consequence of the calculation, a coordinate value $(\alpha, \beta, \gamma)$ of the separation plane 807 on the projection axis 806 is calculated. By assigning the coordinate value to the equation (1), the coefficient d can be obtained. With the obtained coefficient d, the separation plane 710 in the color space shown in FIG. 13 can be calculated. Specifically, the coefficient d is following.

$$d=-(a\alpha+b\beta+c\gamma)$$

In practice, the separation plane calculation portion 103 calculates a separation plane between every two representative colors. To put it differently, the separation plane between every two adjacent representative colors is calculated, and the separation of representative colors is performed using the regions surrounded by the calculated planes. For example, a separation plane is calculated between every two of the frequency distributions 503, and 505 to 508 shown in FIG. 11, and the a representative color is determined for each of the regions surrounded by the separation planes.

Specifically, a positive (+) side and a negative (−) are defined with respect to each separation plane, and then whether the coordination value of a particular representative color is on the positive or the negative side is identified. If the representative color is on the positive side, the coordination values for all the colors existing on the positive side are acquired. Similar operations are performed for all the separation planes, and the region surrounded by the separation planes becomes the region corresponding to the representative color. In this event, to reduce the computation costs, the distance between every two representative colors may be calculated first, and if the representative colors are so remotely separated from each other that the calculated distance is equal to or larger than a predetermined threshold, the separation plane between those remote representative colors does not have to be calculated.

Figure 15:
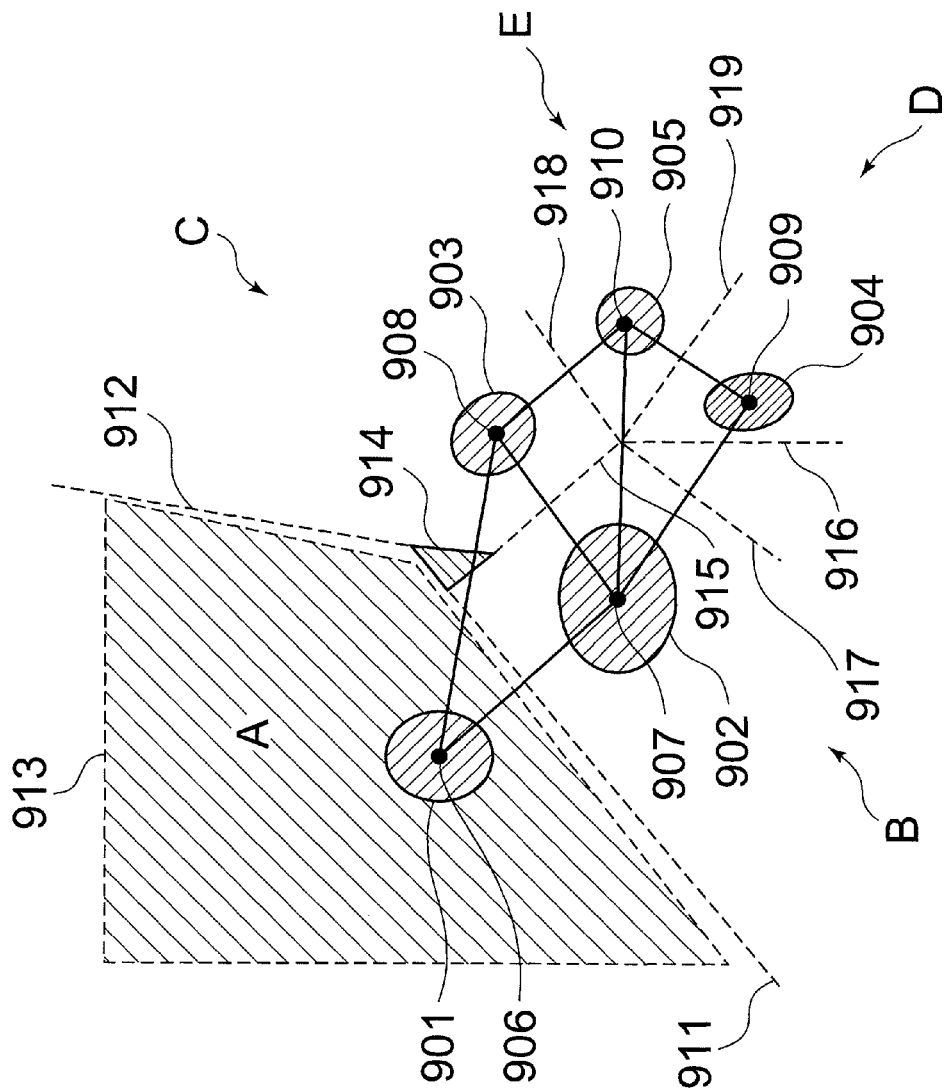
FIG. 15 is a drawing illustrating an example of frequency distribution to explain a situation in which plural separation planes are calculated.

FIG. 15 is a drawing illustrating example frequency distributions to explain a situation in which plural separation planes 911, 912, and 915 to 919 are to be calculated. FIG. 15 is a diagram seen from the side of the origin point for the RGB axes in FIG. 11. In other word, the diagram is one seen from the black-color side. FIG. 15 shows a frequency distribution for blue-colored characters and ruled lines 901 and a representative color 906 for the frequency distribution 901, a frequency distribution for black-colored characters and ruled lines 902 and a representative color 907 for the frequency distribution 902, a frequency distribution for red-colored characters 903 and a representative color 908 for the frequency distribution 903, a frequency distribution for light-black-colored written-in characters 904 by hand-writing using a pencil and a representative color 909 for the frequency distribution 904, and a frequency distribution for vermilion-colored seal 905 and a representative color 910 for the frequency distribution 905.

The portions shown in FIG. 15 correspond respectively to the portions show in FIG. 11 in the following way. The blue-color frequency distribution 901 is the region for the frequency distribution 503. The black-color frequency distribution 902 is the region for the frequency distribution 605. The red-color frequency distribution 903 is the region for the frequency distribution 506. The light-black-colored frequency distribution 904 by hand-writing using a pencil is the region for the frequency distribution 507. The vermilion-color frequency distribution 905 is the region for the frequency distribution 508.

When separation of the blue-color frequency distribution 901 is performed, for example, the separation plane 911 is calculated by using the frequency distribution 901 with the representative color 906 and the black-color frequency distribution 902 with the representative color 907. Similarly, the separation plane 912 is calculated by using the blue-color frequency distribution 901 with the representative color 906 and the red-color frequency distribution 903 with the representative color 908. The blue-color frequency distribution 901 and the vermilion-color frequency distribution 905 are so remotely separated away from each other that the separation plane located between the distributions is not calculated. Similarly, the blue-color frequency distribution 901 and the light-black-colored frequency distribution 904 are so remotely separated away from each other that the separation plane located between the distributions is not calculated. This is because, even if the separation plane between the frequency distribution 901 and the frequency distribution 904 is actually calculated, the calculated separation plane is located outside the separation planes 911 and 912 when seen from the representative color 906. A region 913 is formed as a region surrounded by the separation planes 911 and 912. The formed region 913 is a blue-color region A.

In addition, the separation plane 915 is calculated by using the black-color frequency distribution 902 with the representative color 907 and the red-color frequency distribution 903 with the representative color 908. Moreover, the separation plane 917 is calculated by using the black-color frequency distribution 902 with the representative color 907 and the light-black-colored frequency distribution 904 with the representative color 909. Moreover, the separation plane 916 is calculated by using the black-color frequency distribution 902 with the representative color 907 and the vermilion-color frequency distribution 905 with the representative color 910. Moreover, the separation plane 918 is calculated by using the red-color frequency distribution 903 with the representative color 908 and the vermilion-color frequency distribution 905 with the representative color 910. Furthermore, the separation plane 919 is calculated by using the light-black-colored frequency distribution 904 with the representative color 909 and the vermilion-color frequency distribution 905 with the representative color 910.

If, in the separation of the black-color frequency distribution 902, the distance between the representative color 907 and each of the other three representative colors 906, and 908 to 910 is equal to or shorter than a predetermined threshold, the separation planes 911, 915, and 916 may be calculated and then the region surrounded by these separation planes 911, 915, and 916 may be determined as a black-color region B. Though not illustrated in FIG. 15, the white-color side is separated by the binarization plane 520 shown in FIG. 12.

Accordingly, in practice, the blur-color region A is a region surrounded by three planes including the separation planes 911 and 912 calculated in the above-described way and the binarization plane 520. Similarly, the black-color region B is a region surrounded by four planes including the separation planes 911, 915, and 917 calculated in the above-described way and the binarization plane 520. Further, similarly, a red-color region C is a region surrounded by four planes including the separation planes 912, 915, and 918, and the binarization plane 520. Similarly, a light-black-color region D is a region surrounded by three planes including the separation planes 916 and 919, and the binarization plane 520. In the same way, a vermilion-color region E is a region surrounded by three planes including the separation planes 918 and 919, and the binarization plane 520.

The separation plane calculation portion 103 outputs information of the regions A to E to the color substitution processing portion 104. As described with reference to FIG. 15, the color substitution processing portion 104 substitutes the pixel areas of the inputted document image with representative colors estimated by the representative color estimation portion 102. Specifically, the color substitution processing portion 104 treats the RGB values of the pixels as points in the color space. Then, the color substitution processing portion 104 detects which of the representative colors each of the points is classified into by the separation planes calculated through the separation plane calculation processing. The color substitution processing portion 104 substitutes each of the points with the corresponding representative color. The color substitution processing portion 104 functions as a substitution portion to substitute the color of the pixel area of the document element existing in each separate region in the color space separated by the planes calculated in the above-described way, with the representative color existing in the same separation region.

When the color substitution processing portion 104 performs separation with the separation planes, regions, which belong to none of the regions of representative colors, may be generated in some cases. A region 914 shown in FIG. 15 is an example of such regions. If pixels exist in the region 914, what may be done is not a search for the representative color using the separation planes. Rather, the pixels may be substituted with a representative color identified by checking the peripheral pixels of the substituted document image. Specifically, if a target pixel belongs to none of the representative colors, the pixels located around the target pixel in the eight directions, i.e., pixels located above, below, at the right side of, at the left side of, at the upper-left side of, at the lower-right side of, at the upper-right side of, at the lower-left side of the target pixel may be checked to find out the most frequent representative color. Then, the most frequent representative color may be used as the representative color of the target pixel.

Figure 16:
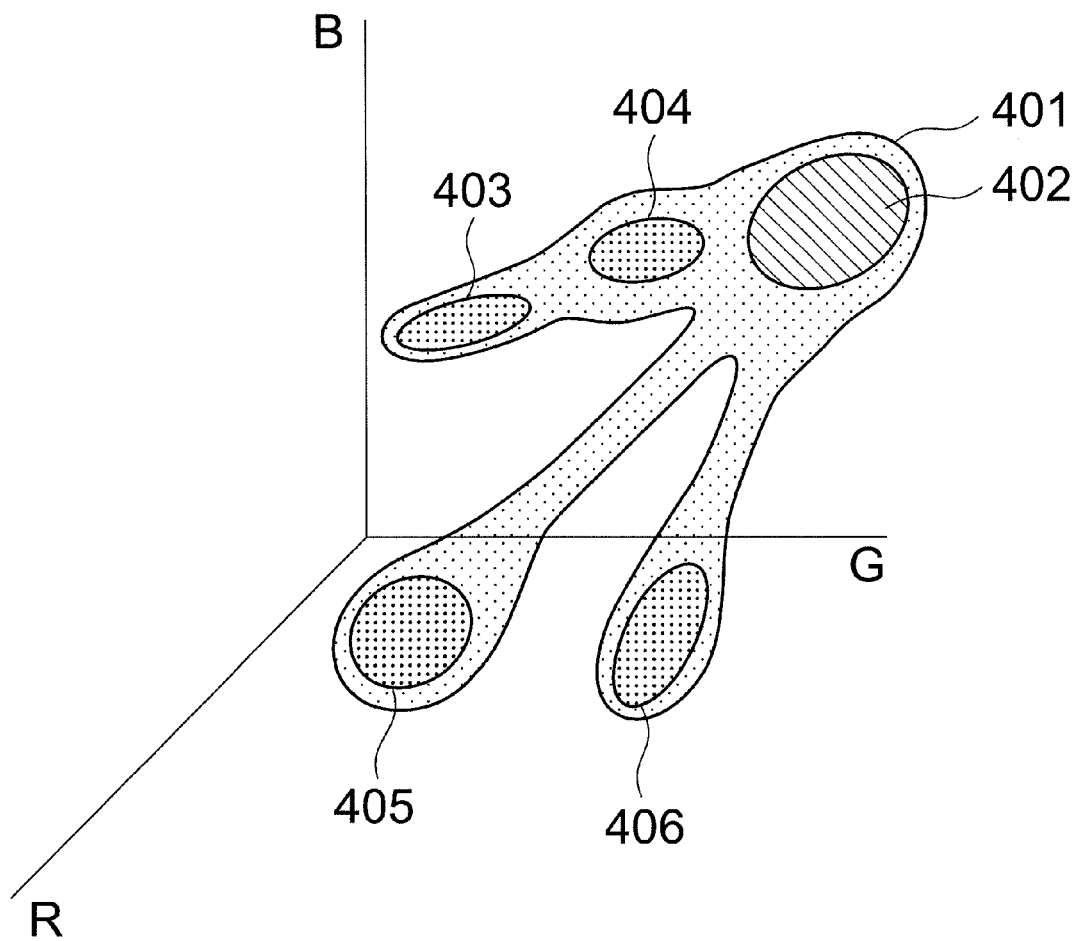
FIG. 16 is a diagram illustrating an example of frequency distribution obtained by a representative color estimation portion in a preprint data.
Figure 17:
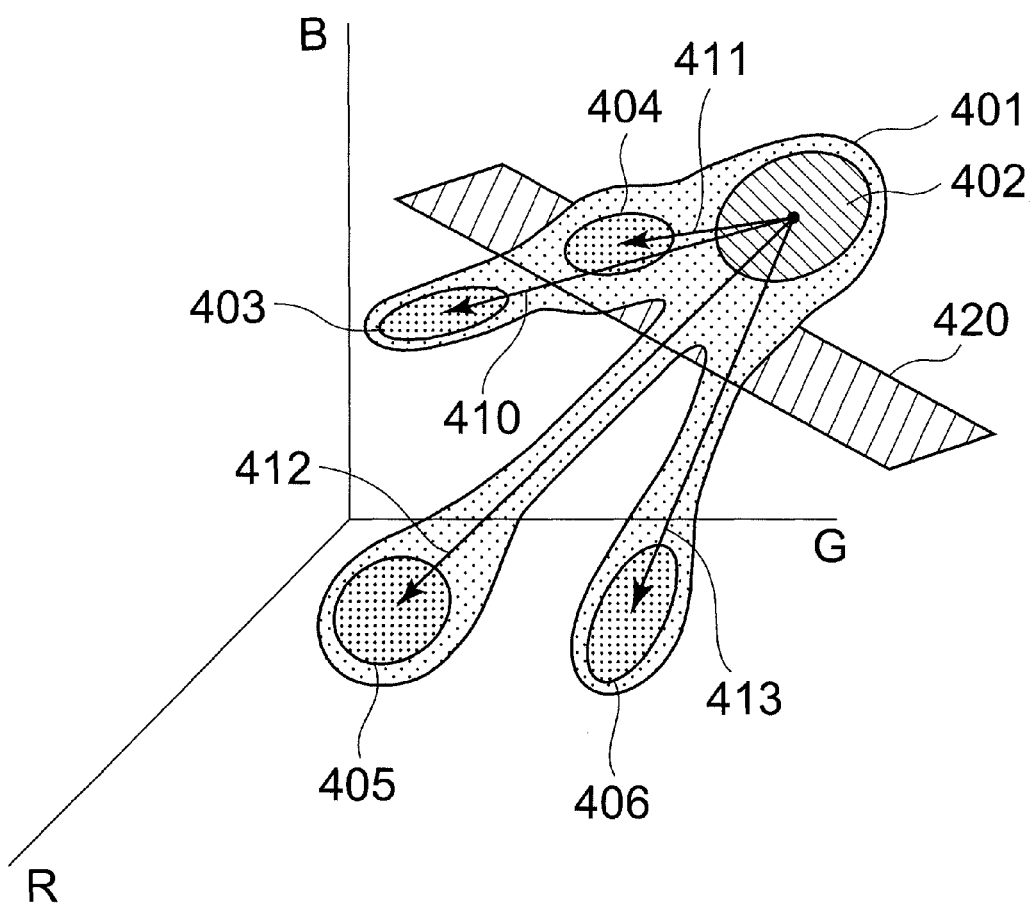
FIG. 17 is a diagram illustrating an example of a binarization plane applying to the frequency distribution obtained by the representative color estimation portion in a preprint data.

The subtraction color processing portion 3 performs color subtraction processing for the stored preprint data 201 shown in FIG. 5. FIG. 16 is a diagram illustrating an example of frequency distribution 401 obtained by the representative color estimation portion 102 in the stored preprint data 201. Furthermore, FIG. 17 is a diagram illustrating an example of a binarization plane 420 applying to the frequency distribution obtained by the representative color estimation portion 102 in the stored preprint data 201. FIG. 17 also shows vectors 410 to 413 which each are representative vectors of the frequency distributions 403 to 406, respectively.

The subtraction color processing portion 3 performs above processing for every pixels included in the inputted document image, then, every pixels are substituted with the representative colors (it is a color subtraction processing), respectively.

The difference image generation portion 4 extracts written-in characters by subtracting the inputted document image from the stored preprint data in order to generate a difference image. Then, the difference image generation portion 4 outputs the difference image including the extracted written-in characters. Operation of the difference image generation portion 4 is explained with reference to FIGS. 18 and 19.

Figure 18:
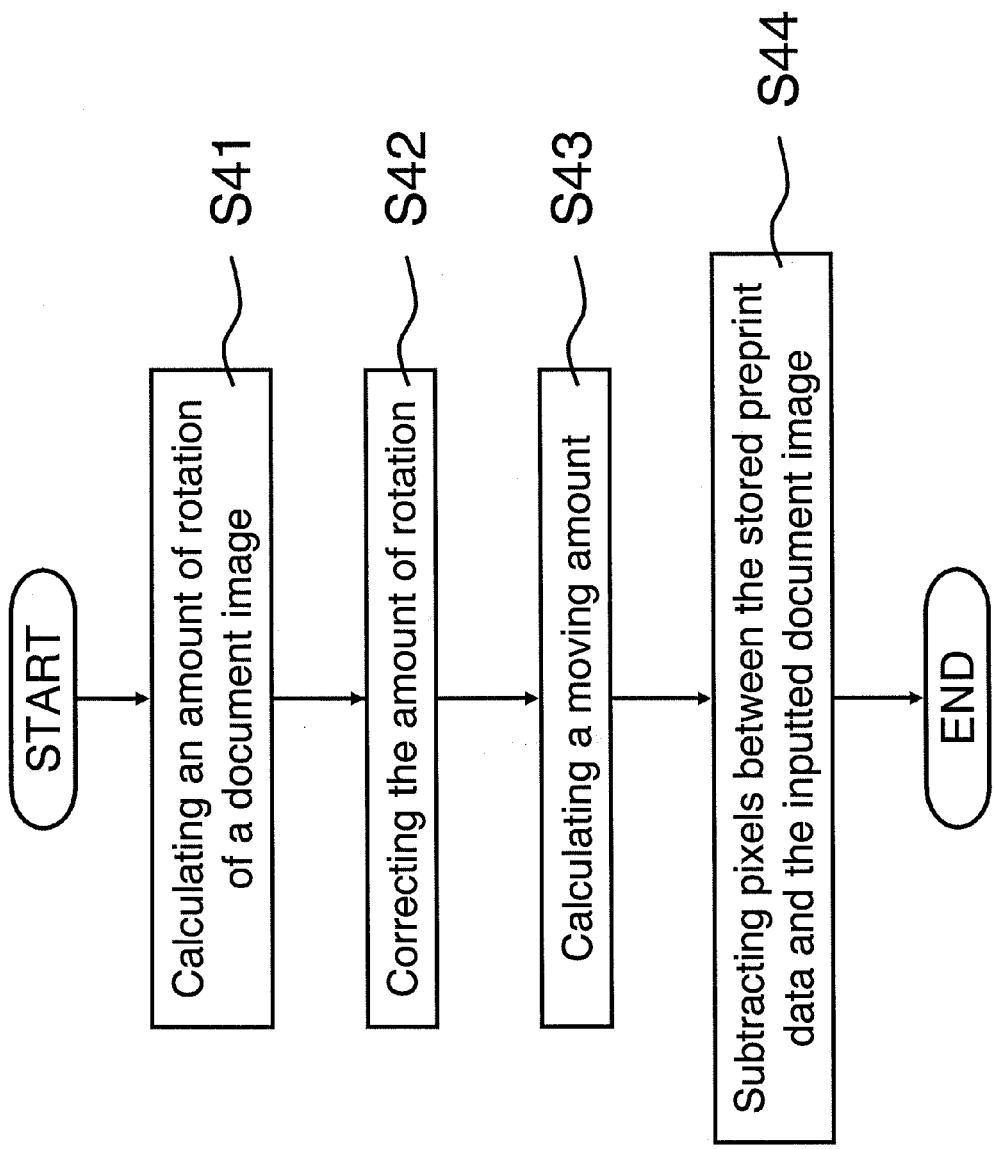
FIG. 18 is a diagram illustrating an example of processing being performed by a difference image generation portion.

FIG. 18 is a diagram illustrating an example of processing being performed by the difference image generation portion 4. First, the difference image generation portion 4 calculates an amount of rotation of a document image for each of the stored preprint data and the inputted document image (step S41). Next, the difference image generation portion 4 corrects the amount of rotation to be zero (step S42).

Generally, image data scanned by a scanner may include rotation. The amount of the rotation may be different depending on a position at which a document is placed on the scanner. If the difference image generation portion 4 obtains the difference image using a document image including rotation, positions of preprinted document elements such as characters and ruled-lines may be shifted. As a result, the difference image includes noise. In order to reduce the noise included in the difference image, the difference image generation portion 4 calculates amount of rotation and corrects the rotation to be zero.

A method disclosed in JP-H5-174183-A may be applied to calculate amount of rotation in the step S41. Moreover, Affine Transform may be used to correct the rotation in the step S42.

Next, the color substitution processing portion 104 calculates moving amount between the stored preprint data and the inputted document image (step S43). When the color substitution processing portion 104 calculates moving amount, either one of the stored preprint data and the inputted document image is fixed in a position. Then, the moving amount is calculated based on a parallel shifted distance of the other one from either one of the stored preprint data and the inputted document image which is fixed in a position. Specifically, the other one moves to x-direction or y-direction dot by dot. As a result, the color substitution processing portion 104 calculates a sum of differences of pixels between the stored preprint data and the inputted document image. If the positions of the stored preprint data and the inputted document image are closer to each other, the sum of differences becomes smaller. Therefore, a pair of x and y achieving the smallest sum of differences can be regarded as a parallel shifted distance. The calculation of the moving amount in the step S43 may be performed for a whole document image. However, the moving amount may not be uniform in the whole document image, because of stretching property of the document and position shift when the document is scanned. In this case, the whole document image is divided into meshes, and the moving amount can be calculated in each of meshes. Also, in the case that the document has a large stretching property, the whole document image may be scaled by calculating previously not only the moving amount but also a scaling ratio.

Next, the color substitution processing portion 104 calculates the difference of each of the pixels between the stored preprint data and the inputted document image (step S44). Then, the color substitution processing portion 104 generates a difference image using the difference of each of the pixels. The difference image includes fewer colors because the color subtraction processing has already completed. In the step S44, firstly, the color substitution processing portion 104 moves the either one of the stored preprint data and the inputted document image according to the moving amount of x and y, which in calculated in the step S43. As a result, the stored preprint data and the inputted document image are placed at a same position.

In the step S44, the color substitution processing portion 104 compares value of each pixel of the stored preprint data with value of each pixel of the inputted document image. If the value of the pixel of the stored preprint data equals to the value of the pixel of the inputted document image, the value of the pixel of the difference image is set to be white. On the other hand, if the value of the pixel of the stored preprint data does not equal to the value of the pixel of the inputted document image, the value of the pixel of the difference image is set to be the value of the pixel of the inputted document image. As a result, the difference image includes only pixels of written-in characters over the stored preprint data. The difference image is stored into the memory device 13 or the main memory portion 14.

Figure 19:
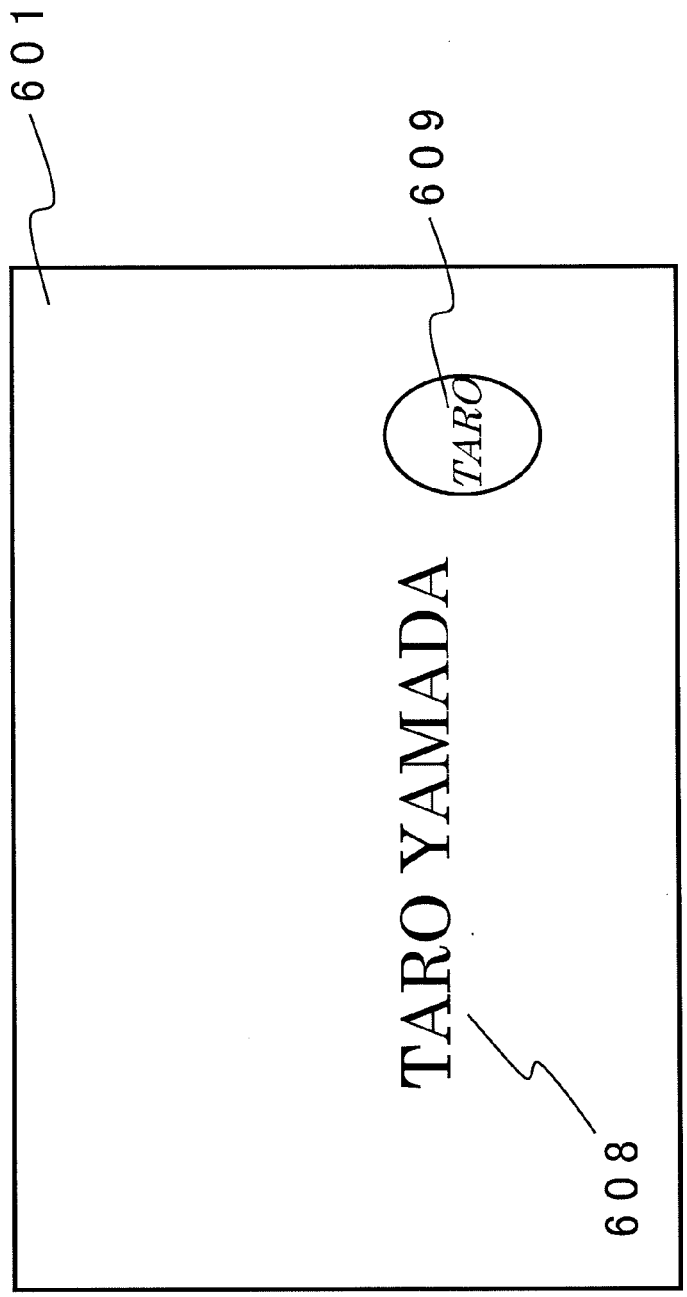
FIG. 19 is a diagram illustrating an example of a difference image obtained by subtracting the preprint data shown in FIG. 5 from the inputted document image shown in FIG. 3.

FIG. 19 is a diagram illustrating an example of a difference image 601 obtained by subtracting the stored preprint data 201 shown in FIG. 5 from the inputted document image 301 shown in FIG. 3. The difference image 601 is obtained by performing operation of the step S44 between a pixel of each representative color in the stored preprint data 201 which is subjected to the color subtracting processing and a pixel of each representative color in the inputted document image 301. In FIG. 19, the difference image 601 includes written-in characters "Yamada Taro" 608 and a seal 609.

According to the first embodiment, the document image processing system can reduce the amount of data by compressing the difference image. It leads to decreases storage capacity and communication traffic.

The document image processing system may further include a reconstruction portion to construct a document image which corresponds to the inputted document image 301 which is subjected to the color subtracting processing by using the stored preprint data 201 which is subjected to the color subtracting processing, and the difference image 602. Specifically, firstly, the reconstruction portion adjusts the positions of the difference image and the stored preprint data to be a same position, based on the moving amount which is calculated when the difference image is generated. Then, the reconstruction portion substitutes a color of a pixel included in the stored preprint data 201 with a color of a pixel included in the difference image 602, if the color of the pixel included in the difference image 602 is not white. Thus, the document image which corresponds to the inputted document image 301 which is subjected to the color subtracting processing is generated.

In this case, the document image processing system stores only the difference image and the stored preprint data. Accordingly, the storage capacity can be decreased. In the first embodiment, the color of the pixel included in the difference image is substituted with white. However, the color of the pixel included in the difference image may be substituted with a color of the background or null.

Description of the Second Embodiment

Figure 20:
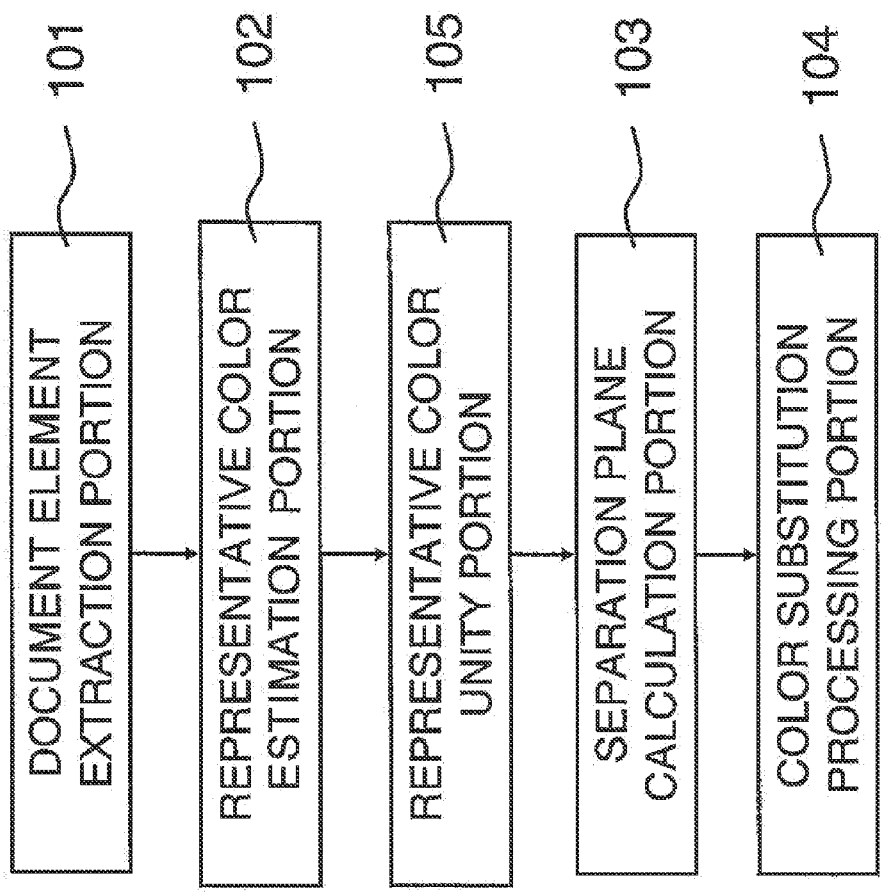
FIG. 20 is a diagram illustrating a functional configuration of a subtraction color processing portion according to a second embodiment.

The second embodiment will be explained with reference to the accompanying drawings. FIG. 20 is a diagram illustrating a functional configuration of a subtraction color processing portion 3 according to the second embodiment. In the second embodiment, the subtraction color processing portion 3 further includes a representative color unity portion 105. Operation of the representative color unity portion 105 is explained with reference to FIGS. 3, 5, 12, 17, 20 and 21. Note that the same description as the first embodiment will be omitted.

The stored preprint data 201 shown in FIG. 5 is an image corresponding to preprinted elements of the inputted document image 301. Therefore, the three-dimensional frequency distribution 401 due to the RGB color model of the stored preprint data 201 is almost same as the three-dimensional frequency distribution 501 due to the RGB color model of the inputted document image 301. This means that the frequency distributions 502 to 506 in the three-dimensional frequency distribution 501 shown in FIG. 12 are almost same as the frequency distributions 402 to 406 shown in FIG. 17, except for the frequency distribution 507 for the light-black-colored written-in characters 308 and the frequency distribution 508 for the vermilion-colored seal 309. However, quantization error and position shift may occur, when the inputted document image 301 shown in FIG. 3 and the stored preprint data 201 shown in FIG. 5 are scanned by the scanner. Also, color shift occurs even if it is a color of the preprint data.

Although the vectors 410 to 413 in FIG. 17 are similar to the vectors 510 to 513 in FIG. 12, these vectors may be different because the color shift occurs among the frequency distributions. The color shift causes noise in the difference image. The representative color unity portion 105 is configured to reduce the noise. If the at least one vector of the vectors 510 to 515 of the inputted document image is similar to the any one of the vectors 411 to 413 (that is the vectors 510 to 513 in the second embodiment), the similar vectors (which are the vectors 510 to 513) are substituted with the vectors 411 to 413. That is, the representative color unity portion 105 substitutes the representative colors of the inputted document image 301 corresponding to the representative colors of the stored preprint data 201 with the representative colors of the stored preprint data 201.

Figure 21:
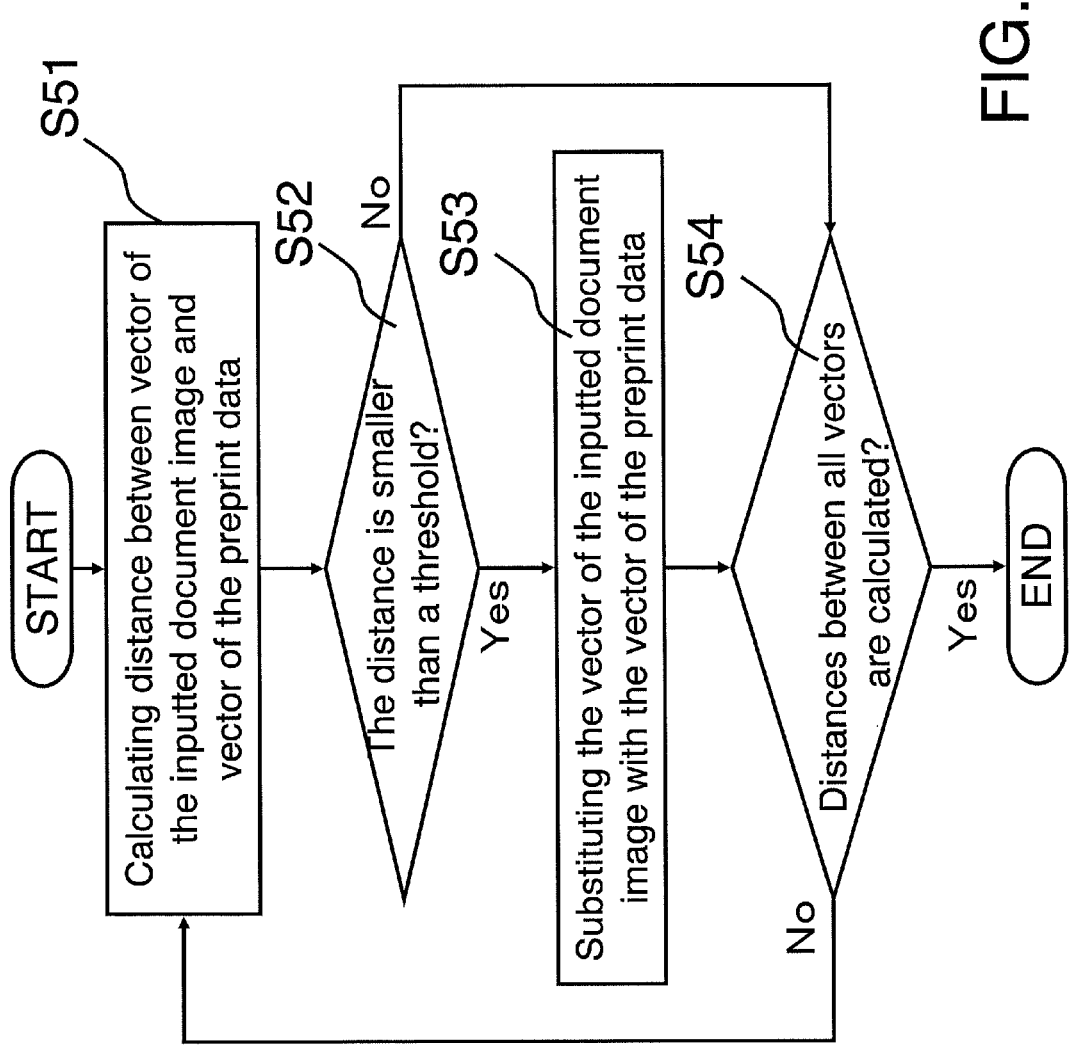
FIG. 21 is a flowchart illustrating an example of processing being performed by a representative color unity portion shown in FIG. 20.

FIG. 21 is a flowchart illustrating an example of processing being performed by the representative color unity portion 105 shown in FIG. 20.

Firstly, the representative color unity portion 105 calculates distances between each of the vectors 510 to 515 shown in FIG. 12 and each of the vectors 410 to 413 shown in FIG. 17. The vectors 510 to 515 are vectors from the frequency distribution 502 for the background color to each of the frequency distributions 503 to 508 in the inputted document image 301 shown in FIG. 12. The vectors 410 to 413 are vectors from the frequency distribution 402 for the background color to each of the frequency distributions 403 to 406 in the preprint data 201 shown in FIG. 17. The distances can be calculated by using Euclidean distance. The representative color unity portion 105 determines whether or not the representative colors are similar to each other, based on the distances (step S51). If the distance between the vector of the stored preprint data 201 and the vector of the inputted document image 301 is smaller than a threshold which is preliminarily determined ("Yes" of the step S52), the representative color unity portion 105 determines that the vector of the inputted document image 301 corresponds to the vector of the stored preprint data 201. However, the several vectors of the stored preprint data 201, which each vector has a smaller distance than the threshold, may exist for one of the vectors of the inputted document image 301. In this case, the representative color unity portion 105 determines that the vector of the stored preprint data 201 which has the smallest distance corresponds to the vector of the inputted document image 301. Then, the representative color unity portion 105 substitutes the vector of the inputted document image 301 with the corresponding vector of the stored preprint data 201 (step S53). This means that the representative color unity portion 105 substitutes the representative colors of the inputted document image 301 with the representative colors of the stored preprint data 201. On the other hand, the distance between the vector of the stored preprint data 201 and the vector of the inputted document image 301 is equal to or larger than the threshold which is preliminarily determined ("No" of the step S52), the representative color unity portion 105 does not substitute the vector of the inputted document image 301 with the corresponding vector of the stored preprint data 201. Accordingly, the representative color unity portion 105 does not substitute the representative colors of the inputted document image 301 with the representative colors of the stored preprint data 201. If there is a distance which is not calculated between each of the vectors of the stored preprint data 201 and each of the vectors of the inputted document image 301 ("No" of the step S54), the operation goes back to the step S51 and the steps S51 to S54 are repeated. On the other hand, all distances between each of the vectors of the stored preprint data 201 and each of the vectors of the inputted document image 301 are calculated ("Yes" of the step S54), processing being performed by the representative color unity portion 105 terminates.

After being performed above processing by the representative color unity portion 105, the subtraction color processing portion 3 performs the color subtraction processing which is same as that of the first embodiment by the separation plane calculation portion 103 and the color substitution processing portion 104, for the inputted document image 310 which is subjected to processing being performed by the representative color unity portion 105. In the second embodiment, when the distance is calculated from the frequency distribution for the background color, the background color of the stored preprint data may be substituted with the color having the highest value in the inputted document image. This is because that the background color has the highest value in general.

According to the second embodiment, the document image processing system can reduce noise which is generated by the difference image generation portion 4 when the difference image generation portion 4 generates a difference image. Moreover, the document image processing system can subtract number of colors.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, while the difference image is generated by using the stored preprint data and the inputted document image which is inputted from the document image input portion 1, the difference image may be generated by using a stored preprint data which is inputted from the document image input portion 1 and an inputted document image including written-in characters over the preprint data, which the inputted document image being inputted from the document image input portion 1. Moreover, when the preprint data is previously stored, a document image of after subtracting the number of colors by the subtraction color processing portion 3, detecting a rotation and correcting the rotation by the difference image generation portion 4.

Thus, the difference image generation portion 4 can reduce the processing time to generate a difference image of between the preprint data and the inputted document image. Furthermore, the frequency distributions for light-blue-colored halftone dots 404, 504 may not be adopted as a representative color through the color subtracting processing, because the frequency distributions for light-blue-colored halftone dots 404, 504 are located on the side being closer to the background color of a binarization plane and information included in the light-blue-colored halftone dots 404, 504 may not be so important. As a result, the light-blue-colored halftone dots may not be left.

What is claimed is:

1. A document image processing system, comprising:
a processor configured to:
extract first document elements of an inputted document image from pixels of the inputted document image and second document elements of a preprint data corresponding to the inputted document image from pixels of the preprint data;
estimate first representative colors in a color space, each of the first representative colors corresponding to one of the first document elements, and second representative colors in the color space, each of the second representative colors corresponding to one of the second document elements;
calculate at least one first plane to separate the color space into first sub-spaces which each includes one of the first representative colors and at least one second plane to separate the color space into second sub-spaces which each includes one of the second representative colors;
substitute a color of a first pixel included in one of the first document elements with the first representative color which is located in one of the first sub-spaces in which the color of the first pixel exists, and a color of a second pixel included in one of the second document elements with the second representative color which is located in one of the second sub-spaces in which the color of the second pixel exists;

subtract each of the substituted first pixels from a corresponding one of the substituted second pixels to generate a difference image; and substitute the first representative color with the second representative color which corresponds to the first representative color, if the first representative color is similar to the second representative color.

2. The document image processing system of claim 1, the processor being further configured to construct a document image by using the preprint data in which the colors of the second pixel are substituted with the second representative colors, and the difference image.

3. The document image processing system of claim 1, further comprising a memory to store the preprint data in which the colors of the second pixel are substituted with the second representative colors, the processor being further configured to subtract each of the substituted first pixels from a corresponding one of the second pixels stored in the memory, to generate the difference image.

4. A document image processing system, comprising:

a processor configured to:

extract first document elements of an inputted document image from pixels of the inputted document image and second document elements of a preprint data corresponding to the inputted document image from pixels of the preprint data;

estimate first representative colors in a color space, each of the first representative colors corresponding to one of the first document elements, and second representative colors in the color space, each of the second representative colors corresponding to one of the second document elements;

calculate at least one first plane to separate the color space into first sub-spaces which each includes one of the first representative colors and at least one second plane to separate the color space into second sub-spaces which each includes one of the second representative colors;

substitute a color of a first pixel included in one of the first document elements with the first representative color which is located in one of the first sub-spaces in which the color of the first pixel exists, and a color of a second pixel included in one of the second document elements with the second representative color which is located in one of the second sub-spaces in which the color of the second pixel exists; and subtract each of the substituted first pixels from a corresponding one of the substituted second pixels to generate a difference image;

the image processing system including a memory to store the preprint data in association with an identification information; and the processor being further configured to identify the preprint data stored in the memory, the identification information of the preprint data being equal to or similar to the identification information of the inputted document image, as a print data corresponding to the inputted document image.

5. The document image processing system of claim 4, the processor being further configured to construct a document image by using the preprint data in which the colors of the second pixel are substituted with the second representative colors, and the difference image.

6. The document image processing system of claim 4, further comprising a memory to store the preprint data in which the colors of the second pixel are substituted with the second representative colors;

the processor being further configured to subtract each of the substituted first pixels from a corresponding one of the second pixels stored in the memory, to generate the difference image.

7. A document image processing method, comprising:

extracting first document elements of an inputted document image from pixels of the inputted document image and second document elements of a preprint data corresponding to the inputted document image from pixels of the preprint data;

estimating first representative colors in a color space, each of the first representative colors corresponding to one of the first document elements, and second representative colors in the color space, each of the second representative colors corresponding to one of the second document elements;

calculating at least one first plane to separate the color space into first sub-spaces which each includes one of the first representative colors and at least one second plane to separate the color space into second sub-spaces which each includes one of the second representative colors;

substituting a color of a first pixel included in one of the first document elements with the first representative color which is located in one of the first sub-spaces in which the color of the first pixel exists, and a color of a second pixel included in one of the second document elements with the second representative color which is located in one of the second sub-spaces in which the color of the second pixel exists;

subtracting each of the substituted first pixels from a corresponding one of the substituted second pixels to generate a difference image; and substituting the first representative color with the second representative color which corresponds to the first representative color, if the first representative color is similar to the second representative color.

8. The document image processing method of claim 7, further comprising constructing a document image by using the preprint data in which the colors of the second pixel are substituted with the second representative colors, and the difference image.

9. The document image processing method of claim 7, further comprising:

storing the preprint data in association with an identification information, and identifying the stored preprint data, the identification information of the preprint data being equal to or similar to the identification information of the inputted document image, as a print data corresponding to the inputted document image.

10. The document image processing method of claim 7, further comprising storing the preprint data in which the colors of the second pixel are substituted with the second representative colors, wherein the difference image is generated by subtracting each of the substituted first pixels from a corresponding one of the second pixels stored in the memory.

11. A non-transitory computer readable storage medium storing instructions, of a computer program for subtracting colors of an inputted document image, which when executed by a computer, cause the computer to perform steps comprising:

extracting first document elements of an inputted document image from pixels of the inputted document image and second document elements of a preprint data corresponding to the inputted document image from pixels of the preprint data;

estimating first representative colors in a color space, each of the first representative colors corresponding to one of the first document elements, and second representative colors in the color space, each of the second representative colors corresponding to one of the second document elements;

calculating at least one first plane to separate the color space into first sub-spaces which each includes one of the first representative colors and at least one second plane to separate the color space into second sub-spaces which each includes one of the second representative colors;

substituting a color of a first pixel included in one of the first document elements with the first representative color which is located in one of the first sub-spaces in which the color of the first pixel exists, and a color of a second pixel included in one of the second document elements with the second representative color which is located in one of the second sub-spaces in which the color of the second pixel exists;

subtracting each of the substituted first pixels from a corresponding one of the substituted second pixels to generate a difference image; and substituting the first representative color with the second representative color which corresponds to the first representative color, if the first representative color is similar to the second representative color.

12. The non-transitory computer readable storage medium of claim 11, wherein the instructions cause the computer to perform a step of constructing a document image by using the preprint data in which the colors of the second pixel are substituted with the second representative colors, and the difference image.

13. The non-transitory computer readable storage medium of claim 11, wherein the instructions cause the computer to perform a step of storing the preprint data in which the colors of the second pixel are substituted with the second representative colors, wherein the difference image is generated by subtracting each of the substituted first pixels from a corresponding one of the second pixels stored in the memory.

14. A non-transitory computer readable storage medium storing instructions, of a computer program for subtracting colors of an inputted document image, which when executed by a computer, cause the computer to perform steps comprising:

extracting first document elements of an inputted document image from pixels of the inputted document image and second document elements of a preprint data corresponding to the inputted document image from pixels of the preprint data;

estimating first representative colors in a color space, each of the first representative colors corresponding to one of the first document elements, and second representative colors in the color space, each of the second representative colors corresponding to one of the second document elements;

calculating at least one first plane to separate the color space into first sub-spaces which each includes one of the first representative colors and at least one second plane to separate the color space into second sub-spaces which each includes one of the second representative colors;

substituting a color of a first pixel included in one of the first document elements with the first representative color which is located in one of the first sub-spaces in which the color of the first pixel exists, and a color of a second pixel included in one of the second document elements with the second representative color which is located in one of the second sub-spaces in which the color of the second pixel exists;

subtracting each of the substituted first pixels from a corresponding one of the substituted second pixels to generate a difference image;

storing the preprint data in association with an identification information; and identifying the stored preprint data, the identification information of the preprint data being equal to or similar to the identification information of the inputted document image, as a print data corresponding to the inputted document image.

15. The non-transitory computer readable storage medium of claim 14, wherein the instructions cause the computer to perform a step of constructing a document image by using the preprint data in which the colors of the second pixel are substituted with the second representative colors, and the difference image.

16. The non-transitory computer readable storage medium of claim 14, wherein the instructions cause the computer to perform a step of storing the preprint data in which the colors of the second pixel are substituted with the second representative colors, wherein the difference image is generated by subtracting each of the substituted first pixels from a corresponding one of the second pixels stored in the memory.

* * * * *